United States Patent
Omori et al.

(10) Patent No.: US 8,005,321 B2
(45) Date of Patent: Aug. 23, 2011

(54) PIXEL CLOCK GENERATOR, OPTICAL SCANNER, AND IMAGE FORMING APPARATUS

(75) Inventors: Atsufumi Omori, Kanagawa (JP); Masaaki Ishida, Kanagawa (JP); Yasuhiro Nihei, Kanagawa (JP); Dan Ozasa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 862 days.

(21) Appl. No.: 11/062,671

(22) Filed: Feb. 23, 2005

(65) Prior Publication Data

US 2005/0219354 A1 Oct. 6, 2005

(30) Foreign Application Priority Data

Feb. 23, 2004 (JP) ................................. 2004-047074

(51) Int. Cl.
*G06K 7/00* (2006.01)
(52) U.S. Cl. ........................ 382/318; 382/312
(58) Field of Classification Search .................. None
See application file for complete search history.

(56) References Cited

U.S. PATENT DOCUMENTS

| | | | | |
|---|---|---|---|---|
| 4,796,095 A | * | 1/1989 | Shimada | 358/409 |
| 5,086,223 A | * | 2/1992 | Hidaka | 250/235 |
| 5,194,879 A | * | 3/1993 | Kotabe et al. | 347/254 |
| 5,400,044 A | * | 3/1995 | Thomas | 345/690 |
| 5,495,341 A | * | 2/1996 | Kawana et al. | 358/3.21 |
| 5,519,500 A | * | 5/1996 | Kumamoto | 358/296 |
| 5,548,321 A | | 8/1996 | Murakami et al. | |
| 5,671,069 A | * | 9/1997 | Kodama | 358/474 |
| 5,764,378 A | * | 6/1998 | Oda et al. | 358/448 |
| 5,889,534 A | * | 3/1999 | Johnson et al. | 347/19 |
| 6,317,246 B1 | * | 11/2001 | Hayashi et al. | 359/204.1 |
| 6,351,277 B1 | * | 2/2002 | Skillman | 347/235 |
| 6,791,596 B2 | * | 9/2004 | Nihei et al. | 347/247 |
| 6,927,789 B2 | * | 8/2005 | Ozasa et al. | 347/249 |
| 6,933,957 B2 | * | 8/2005 | Omori et al. | 347/249 |
| 7,212,224 B2 | * | 5/2007 | Nihei et al. | 347/235 |
| 7,256,815 B2 | * | 8/2007 | Suzuki et al. | 347/249 |

(Continued)

FOREIGN PATENT DOCUMENTS

JP 01228415 A * 9/1989

(Continued)

OTHER PUBLICATIONS

U.S. Appl. No. 11/494,528, filed Jul. 28, 2006, Nihei, et al.

(Continued)

*Primary Examiner* — Samir A Ahmed
*Assistant Examiner* — Jayesh Patel
(74) *Attorney, Agent, or Firm* — Oblon, Spivak, McClelland, Maier & Neustadt, L.L.P.

(57) ABSTRACT

A pixel clock generator that generates a pixel clock to regulate a drive timing of a scanning light source includes a data generating circuit that generates phase data based on a phase data pattern to correct an uneven scanning speed and fluctuation of scanning widths, and a pixel clock generating circuit generates a pixel clock having a long cycle based on a high-frequency clock and that performs a phase shift for the pixel clock based on the high-frequency clock. The phase pattern is set-such that difference in an amount of the phase shift between the pixel clocks adjacent to each other does not exceed a basic amount of the phase shift of the pixel clock generating circuit.

15 Claims, 17 Drawing Sheets

U.S. PATENT DOCUMENTS

| | | |
|---|---|---|
| 7,271,824 B2 | 9/2007 | Omori et al. |
| 7,283,151 B2 * | 10/2007 | Nihei et al. .................... 347/249 |
| 2002/0051137 A1 * | 5/2002 | Ema et al. ...................... 358/1.1 |
| 2003/0025785 A1 * | 2/2003 | Nihei et al. .................... 347/250 |
| 2003/0067533 A1 * | 4/2003 | Omori et al. .................. 347/248 |
| 2003/0156184 A1 * | 8/2003 | Suzuki et al. ................. 347/249 |
| 2004/0032482 A1 * | 2/2004 | Ozasa et al. .................. 347/237 |
| 2004/0125199 A1 * | 7/2004 | Omori et al. .................. 347/249 |
| 2004/0160509 A1 * | 8/2004 | Nihei et al. ................... 347/247 |

FOREIGN PATENT DOCUMENTS

| | | |
|---|---|---|
| JP | 02151462 A * | 6/1990 |
| JP | 6-242386 | 9/1994 |
| JP | 8-258329 | 10/1996 |
| JP | 11-167081 | 6/1999 |
| JP | 2001-228415 | 8/2001 |
| JP | 2002-36626 | 2/2002 |
| JP | 2003-15068 | 1/2003 |
| JP | 2003-34051 | 2/2003 |
| JP | 2003-103830 | 4/2003 |

OTHER PUBLICATIONS

U.S. Appl. No. 12/029,115, filed Feb. 11, 2008, Omori, et al.

U.S. Appl. No. 12/055,666, filed Mar. 26, 2008, Tanabe, et al.

* cited by examiner

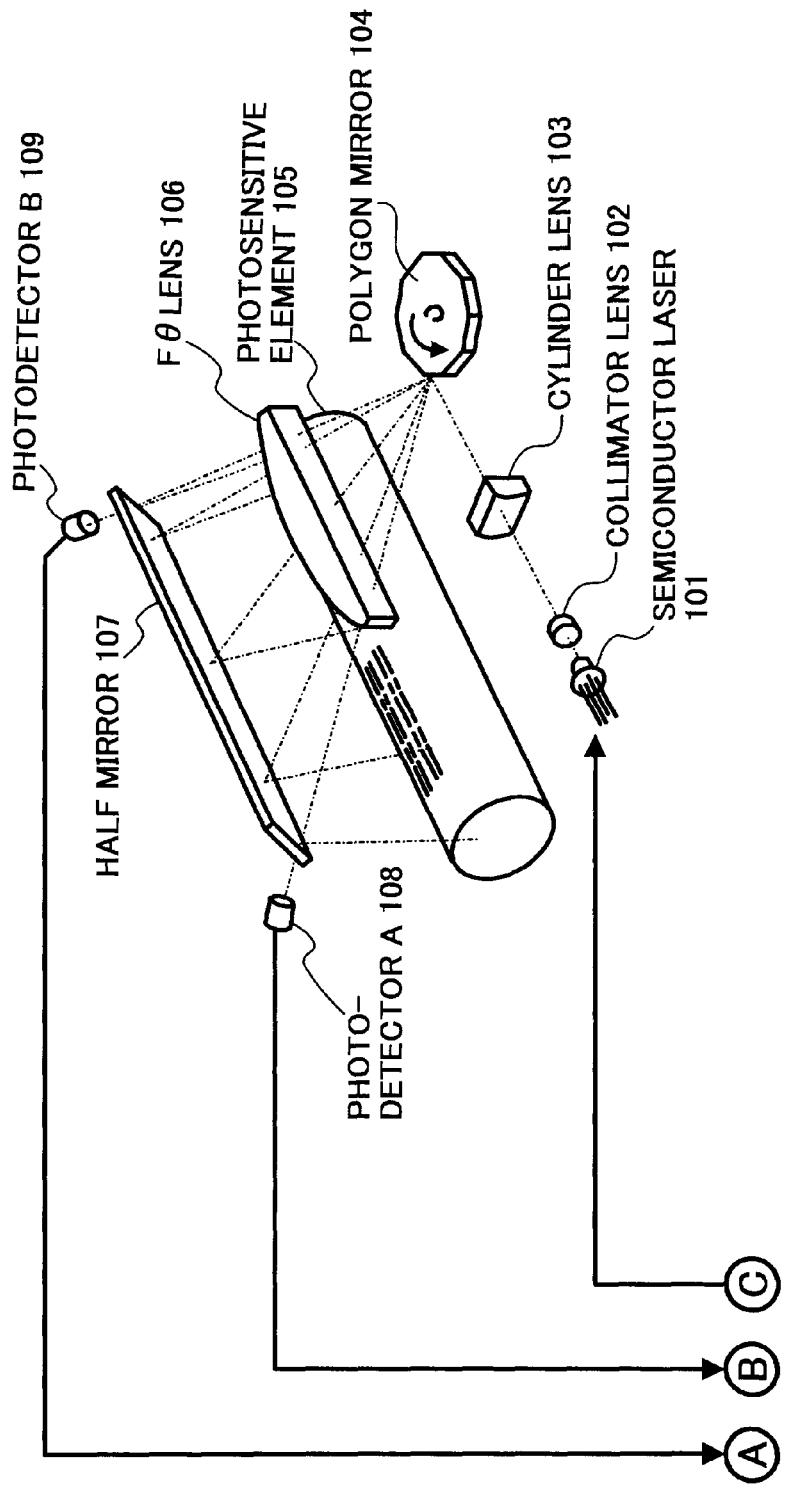

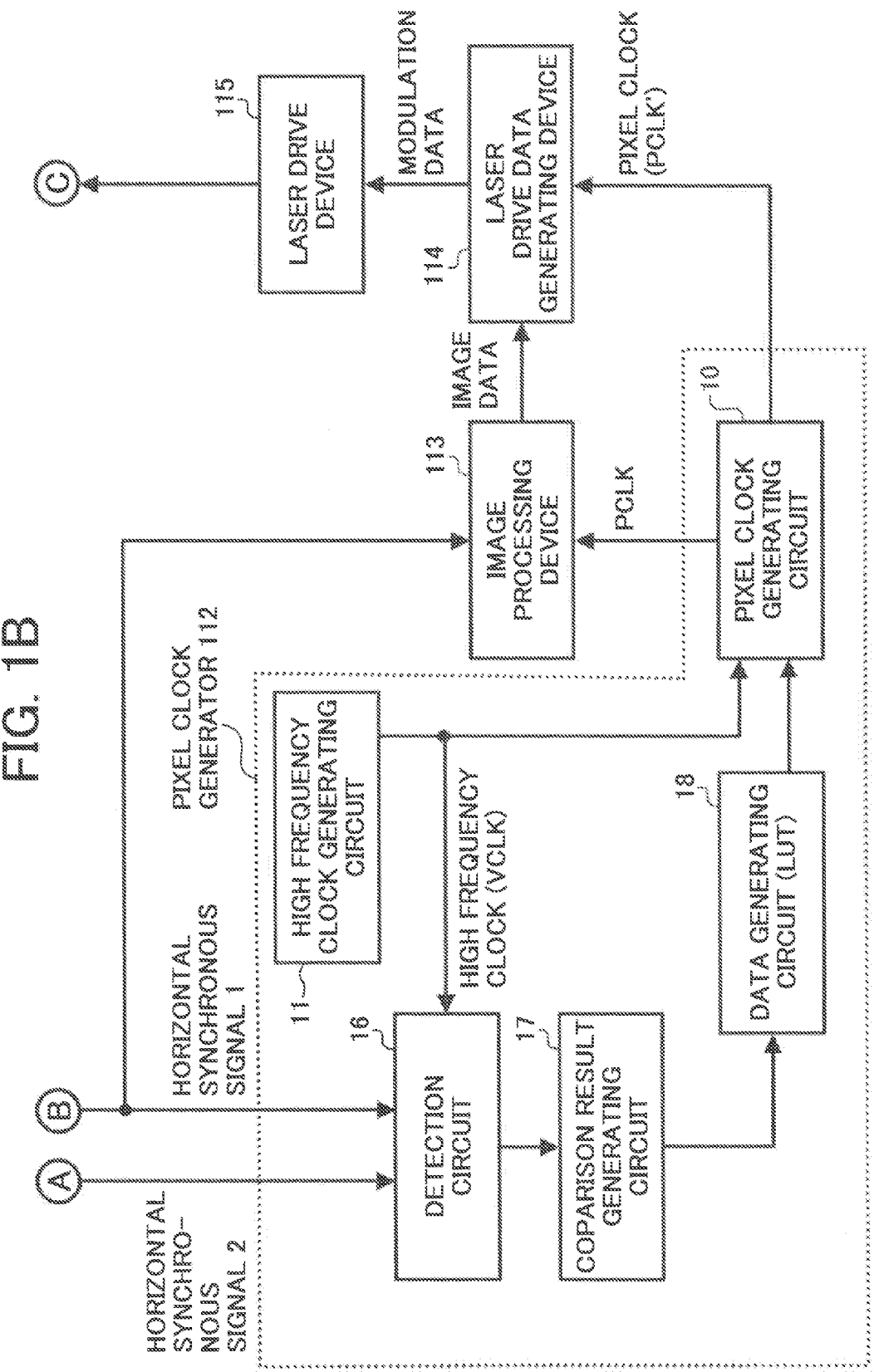

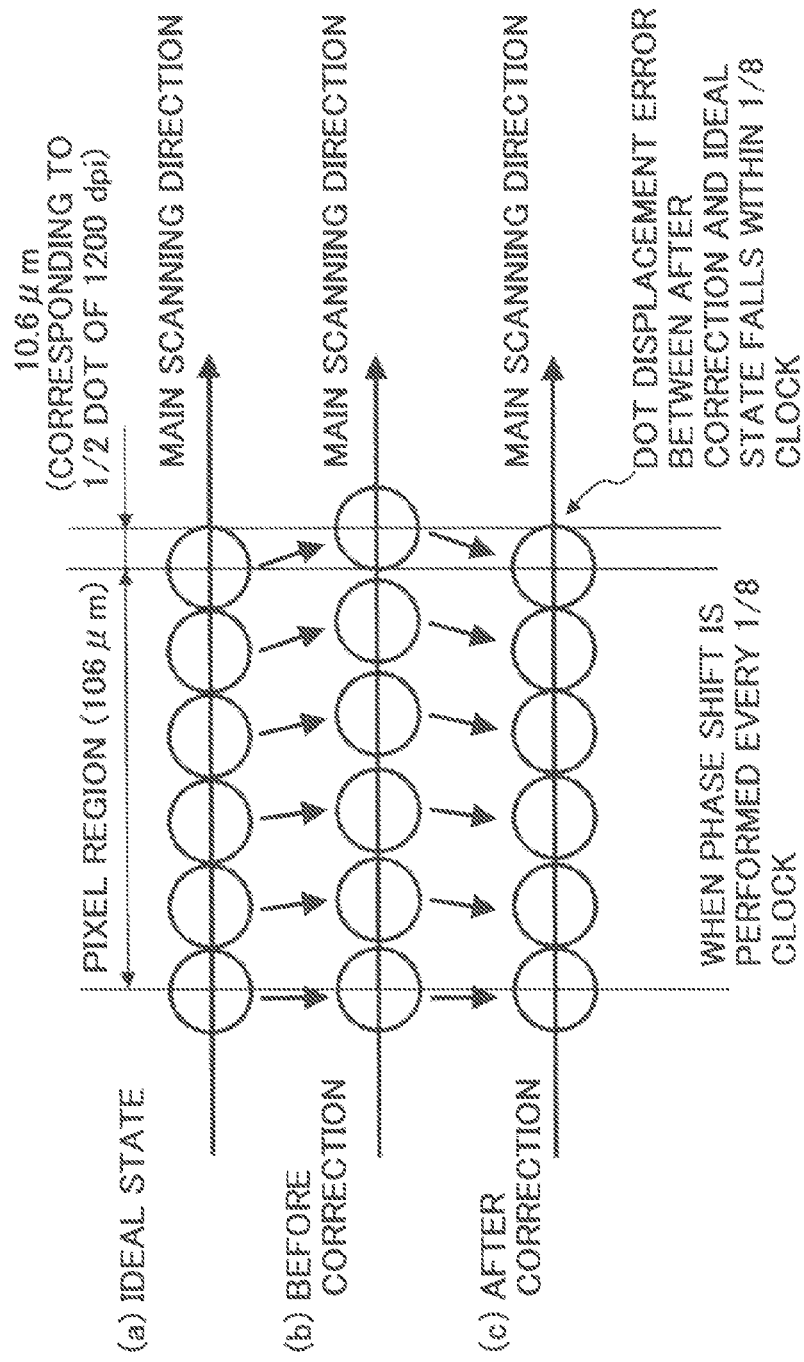

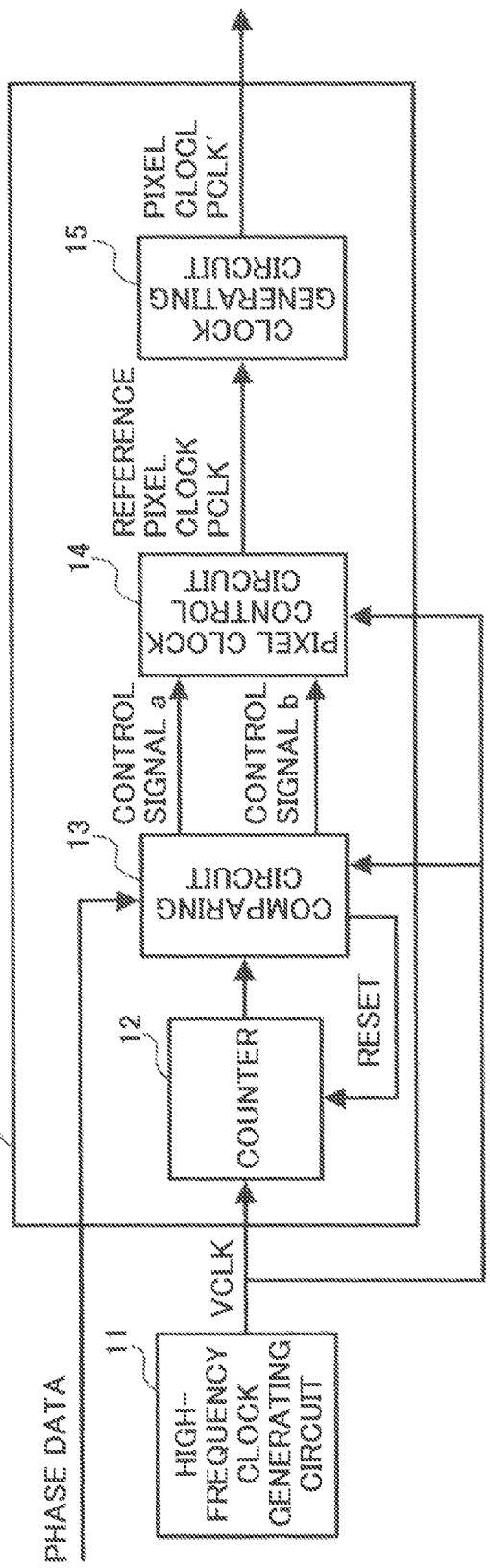

PIXEL CLOCK GENERATOR, OPTICAL SCANNER, AND IMAGE FORMING APPARATUS

CROSS-REFERENCE TO RELATED APPLICATIONS

The present document incorporates by reference the entire contents of Japanese priority document, 2004-047074 filed in Japan on Feb. 23, 2004.

BACKGROUND OF THE INVENTION

1) Field of the Invention

The present invention relates to an image forming apparatus such as a laser printer or a digital copying machine and, more particularly, to a pixel clock generator that regulates a drive timing of a scanning light source.

2) Description of the Related Art

A general configuration of an image forming apparatus such as a laser printer or a digital copying machine is shown in FIG. 19. A laser beam output from a semiconductor laser unit 1001 scanned by a rotating polygon mirror 1002 to form an optical spot on a photosensitive element 1004 serving as a media to be scanned through a scanner lens 1003, and the photosensitive element 1004 is exposed to form an electrostatic latent image. At this time, a photodetector 1005 detects a scanning beam every line to output a signal. A phase synchronizing circuit 1009 inputs a clock from a clock generating circuit 1008 and generates an image clock (pixel clock) the phase of which is synchronized every line by an output signal from the photodetector 1005. This image clock is supplied to an image forming unit 1006 and also supplied to a laser drive circuit 1007 through the image forming unit 1006. The semiconductor laser unit 1001 controls emission time of a semiconductor laser according to the image data formed by the image forming unit 1006 and an image clock to control an electrostatic latent image on the photosensitive element 1004.

In such a scanning optical system, a fluctuation of a distance from a rotating axis of a polarizing reflective surface of a polarizer such as a polygon mirror generates an uneven scanning speed of an optical spot (scanning beam) which scans a surface to be scanned. The uneven scanning speed causes displacement of dots to be recorded to flicker an image, thereby deteriorating image quality. Therefore, when a high-quality image is required, au uneven scanning speed must be corrected.

In addition, in a multi-beam optical system having a plurality of light sources, when oscillation wavelengths of the light sources are different from each other, an exposure error occurs in an optical system in which aberration chromatica of a scanning lens is not corrected. The aberration chromatica also causes displacement of dots to be recorded. In addition, a scanning width set when a spot scans a medium to be scanned changes depending on the light sources to cause deterioration of image quality. Therefore, the scanning width must be corrected.

A technology for correcting an uneven scanning speed is disclosed in, for example, Japanese Patent Application Laid-Open No. 11-167081 and Japanese Patent Application Laid-Open No. 2001-228415. Such technology includes a method of basically changing a frequency of a pixel clock to control an optical spot position along a scanning line.

The following method is also known. That is, clocks in a period in which a scanning beam passes through two photodetectors arranged both the ends of a photosensitive element are counted to detect a scanning speed, and, depending on the result, a rotating speed of a polygon mirror is controlled. FIG. 20 depicts an example of the conventional method. In FIG. 20, reference numeral 1105 denotes a photosensitive element; 1107 and 1108, photodetectors arranged both the ends of the photosensitive element 1105; 1111, a scanning speed detecting unit that counts clocks between a detection signal from the photodetector 1107 to a detection signal from the photodetector 1108 to detect a scanning speed and to output a correction signal; and 1112, a polygon motor control unit that controls a rotating speed of a drive motor (not shown) of a polygon mirror 1104 depending on the correction signal. Reference numeral 1101 denotes a semiconductor laser; 1102, a collimator lens; 1103, a cylinder lens; 1106, an f-θ lens; 1109, a folding mirror; and 1110, a toroidal lens.

In another method, for example, in the configuration shown in FIG. 20, a time interval between the detection signals from the photodetectors 1107 and 1108 is measured by a high-frequency clock, and on the basis of the count information, the phase of a pixel clock is shifted to control the position of an optical spot. Such a technology is disclosed in, for example, Japanese Patent Application Laid-Open No. 2002-36626.

A conventional system (frequency modulation system) which changes a frequency of a pixel clock generally includes a pixel clock control unit having a complex configuration, and the complexity of the configuration increases in proportion to a decrease in frequency modulation width. For this reason, detailed control cannot be easily performed. Even though an optical beam polarized by the same polarizing reflective surface is used, an uneven scanning speed disadvantageously occurs due to rotating jitter of a polarizer or expansion/shrinkage of a scanning lens caused by a change in temperature. A method of controlling a rotating motor of the polarizer is hard to control the rotating motor at high accuracy.

A system that controls the position of a scanning spot on each scanning line by control of a phase shift of a pixel clock as described in Patent Document 3 is free from the problems posed in the two systems described above. The system is generally advantageously used as a system that corrects an uneven scanning speed or fluctuation of scanning widths at high accuracy.

SUMMARY OF THE INVENTION

It is an object of the present invention to solve at least the above problems in the conventional technology.

A pixel clock generator according to one aspect of the present invention generates a pixel clock to regulate a drive timing of a light source that generates an optical beam to scan a medium to be scanned, and includes a phase data generating unit that generates a phase data according to a phase data pattern to correct an uneven scanning speed and fluctuation of scanning widths; and a-pixel clock generating unit that generates, based on a high-frequency clock, a pixel clock of which a cycle is longer than a cycle of the high-frequency clock and that performs a phase shift for the pixel clock based on the phase data. The phase data pattern is set such that a difference in an amount of the phase shift between the pixel clocks that are adjacent to each other does not exceed a basic amount of the phase shift of the pixel clock generating unit.

An optical scanner according to another aspect of the present invention drives a light source based on image data, and that scans a medium to be scanned with an optical beam output from the light source, and includes a pixel clock generator that generates a pixel clock, and that includes a phase data generating unit that generates a phase data according to a phase data pattern to correct an uneven scanning speed and fluctuation of scanning widths; and a pixel clock generating unit that generates, based on a high-frequency clock, a pixel clock of which a cycle is longer than a cycle of the high-frequency clock and that performs a phase shift for the pixel clock based on the phase data, and the phase data pattern is set such that a difference in an amount of the phase shift between the pixel clocks that are adjacent to each other does not exceed a basic amount of the phase shift of the pixel clock generating unit. A drive timing of the light source is regulated by the pixel clock generated.

An optical scanner according to still another aspect of the present invention drives a plurality of light sources based on image data, and that scans a medium to be scanned simultaneously with a plurality of optical beams output from the light sources, and includes a pixel clock generator that generates a pixel clock to regulate a drive timing of the light sources, and that includes a phase data generating unit that generates a phase data according to a phase data pattern to correct an uneven scanning speed and fluctuation of scanning widths; and a pixel clock generating unit that generates, based on a high-frequency clock, a pixel clock of which a cycle is longer than a cycle of the high-frequency clock and that performs a phase shift for the pixel clock based on the phase data, and the phase data pattern is set such that a difference in an amount of the phase shift between the pixel clocks that are adjacent to each other does not exceed a basic amount of the phase shift of the pixel clock generating unit. The pixel clock generator generates the pixel clock-that corresponds to each of the light sources, and the drive timing of each of the light sources is regulated by the pixel clock that corresponds to each of the light sources.

An image forming apparatus according to still another aspect of the present invention-includes an optical scanner that drives a light source based on image data, and that scans a medium to be scanned with an optical beam output from the light source that includes a pixel clock generator that generates a pixel clock including a phase data generating unit that generates a phase data according to a phase data pattern to correct an uneven scanning speed and fluctuation of scanning widths; and a pixel clock generating unit that generates, based on a high-frequency clock, a pixel clock of which a cycle is longer than a cycle of the high-frequency clock and that performs a phase shift for the pixel clock based on the phase data, and the phase data pattern is set such that a difference in an amount of the phase shift between the pixel clocks that are adjacent to each other does not exceed a basic amount of the phase shift of the pixel clock generating unit, and a drive timing of the light source is regulated by the pixel clock generated; and a medium to be scanned by the optical scanner. An electrostatic latent image of an image is formed on the medium by scanning the image with the optical scanner.

An image forming apparatus according to still another aspect of the present invention includes an optical scanner that drives a plurality of light sources based on image data, and that scans a medium to be scanned simultaneously with a plurality of optical beams output from the light sources that includes a pixel clock generator that generates a pixel clock to regulate a drive timing of the light sources including a phase data generating unit that generates a phase data according to a phase data pattern to correct an uneven scanning speed and fluctuation of scanning widths; and a pixel clock generating unit that generates, based on a high-frequency clock, a pixel clock of which a cycle is longer than a cycle of the high-frequency clock, and that performs a phase shift for the pixel clock based on the phase data, and the phase data pattern is set such that a difference in an amount of the phase shift between the pixel clocks that are adjacent to each other does not exceed a basic amount of the phase shift of the pixel clock generating unit, and the pixel clock generator generates the pixel clock that corresponds to each of the light sources, and the drive timing of each of the light sources is regulated by the pixel clock that corresponds to each of the light sources; and medium to be scanned by the optical scanner. An electrostatic latent image of an image is formed on the medium by scanning the image with the optical scanner.

An image forming apparatus according to still another aspect of the present invention scans a plurality of mediums to be scanned that are of different colors by an optical beam output from a plurality of light sources for each color that are driven based on image data to form electrostatic latent images for each color on the mediums, comprising a pixel clock generator that generates a pixel clock to regulate a drive timing of the light sources, and includes a phase data generating unit that generates a phase data according to a phase data pattern to correct an uneven scanning speed and fluctuation of scanning widths; and a pixel clock generating unit that generates, based on a high-frequency clock, a pixel clock of which a cycle is longer than a cycle of the high-frequency clock and that performs a phase shift for the pixel clock based on the phase data, and the phase data pattern is set such that a difference in an amount of the phase shift between the pixel clocks that are adjacent to each other does not exceed a basic amount of the phase shift of the pixel clock generating unit. The pixel clock generator generates the pixel clock that corresponds to each of the light sources, and the drive timing of each of the light sources is regulated by the pixel clock that corresponds to each of the light sources.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 1 is a schematic of an image forming apparatus according to an embodiment of the present invention;

FIG. 2 is a schematic of correction of displacement of dots caused by a phase shift of pixel clocks;

FIG. 3 is a block diagram of a pixel clock generating circuit according to the embodiment;

DETAILED DESCRIPTION

Figure 4A:
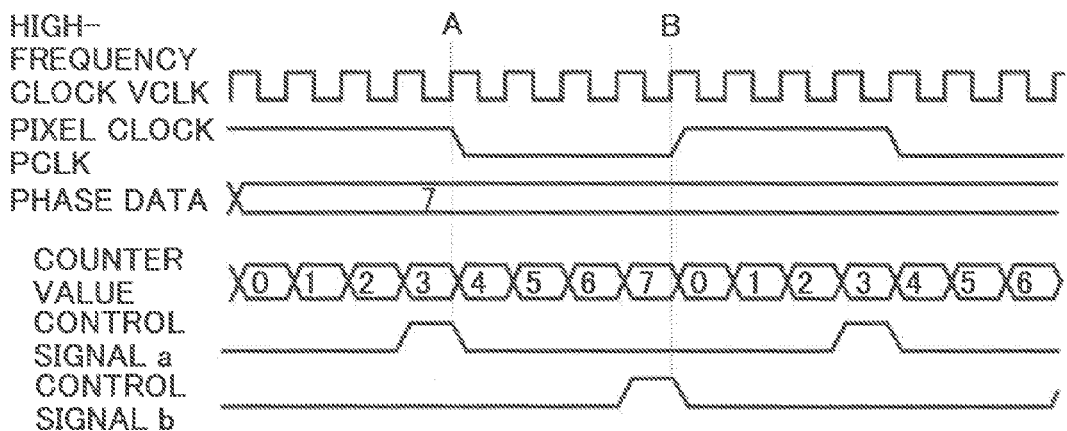
FIGS. 4A to 4C are timing charts of the pixel clock generating circuit according to the embodiment.

Exemplary embodiments of an image forming apparatus according to the present invention will be described below in detail with reference to the accompanying drawings.

FIG. 1 is a schematic of an image forming apparatus according to an embodiment of the present invention and a pixel clock generator of the image forming apparatus.

The configuration itself of a scanning system of the image forming apparatus is same as that of a conventional scanning system. A laser beam from a semiconductor laser 101 serving as a light source passes through a collimator lens 102 and a cylinder lens 103 and polarized and deflectively scanned by a polygon mirror 104. The laser beam is reflected (partially transmitted) by a half mirror 107 through an fθ lens 106 serving as a scanning lens, and is incident on a photosensitive element 105 serving as a medium to be scanned to form an optical beam spot on a surface to be scanned on the photosensitive element 105, so that an image (electrostatic latent image) is formed. In order to detect scanning times of respective lines by the laser beam, a photodetector 108 and a photodetector 109 to receive the laser beam transmitted through the half mirror 107 are arranged. Detection signals from the photodetectors are transmitted to a pixel clock generator 112 as horizontal synchronous signals 1 and 2, and the horizontal synchronous signal 1 is also transmitted to an image processing device 113.

A charger to uniformly charge the photosensitive element 105, a developing unit to develop an electrostatic latent image into a toner image, a transcriber which transfers the toner image on the photosensitive element to a sheet of recording paper or an intermediate transfer medium, a cleaner which removes and collects residual toner on the photosensitive element, and the like are arranged around the photosensitive element 105. However, since these components are the same as those in a general configuration, the components are not shown.

A part constituted by elements directly related to scanning of the photosensitive element 105 except for the photosensitive element 105 and the units arranged around the photosensitive element 105 is an optical scanner according to the embodiment.

A pixel clock generator 112 according to the embodiment is constituted by a high-frequency clock generating circuit 11, a detection circuit 16, a comparison result generating circuit 17, a data generating circuit 18, and a pixel clock generating circuit 10. The high-frequency clock generating circuit 11 generates a high-frequency clock VCLK serving as a source of a pixel clock. The detection circuit 16 is a unit that measures a time interval between the horizontal synchronous signal 1 and the horizontal synchronous signal 2 by counting the high-frequency clocks VCLK. The comparison result generating circuit 17 detects a difference between the time measured by the detection circuit 16, i.e., a count value of high-frequency clocks between the horizontal synchronous signals 1 and 2 and a target value of a preset horizontal scanning time. The data generating circuit 18 is a unit that generates phase data for controlling phase shift of pixel clocks on the basis of the output value from the comparison result generating circuit 17.

The data generating circuit 18 is constituted by a look-up table (LUT) or the like, and holds a plurality of phase data patterns of different types to correct an uneven scanning speed or fluctuation of scanning widths on each line inside the data generating circuit 18. An optimum phase data pattern is selected depending on a variation of scanning time of lines previous to a current line. Phase data depending on the patterns are sequentially output in synchronism with pixel clocks.

The pixel clock generating circuit 10 is a unit that generates pixel clocks on the basis of the high-frequency clock VCLK, and performs phase shift of the pixel clocks according to the phase data. The pixel clock generating circuit 10 according to the embodiment generates pixel clocks of two types. More specifically, the pixel clock generating circuit 10 generates a reference pixel clock PCLK the phase shift amount is directly controlled depending on phase data and a pixel clock PCLK' ("original" pixel clock for directly regulating a drive timing of a laser source, i.e., a pixel recording timing) the cycle of which is twice the cycle of the reference pixel clock PCLK. The reference pixel clock PCLK is given to the image processing device 113, and the pixel clock PCLK' is given to a laser drive data generating device 114.

An image processing device 113 uses the horizontal synchronous signal 1 as a line synchronous signal to output image data of each line to the laser drive data generating device 114 in synchronism with the reference pixel clock PCLK. The laser drive data generating device 114 outputs a laser drive data (modulation data) based on the input image data to a laser drive device 115 in synchronism with the pixel clock PCLK'. The laser drive device 115 supplies a drive current depending on the laser drive data to the semiconductor laser 101 to cause the semiconductor laser 101 to output a laser beam modulated by the image data.

With the configuration, the phase shift of the pixel clock PCLK' for regulating a pixel recording timing on each line is controlled to correct displacement of dots and fluctuation of scanning widths caused by an uneven scanning speed on the lines (including an exposure error caused by a difference between wavelengths of light sources when a multi-beam light source is used). Therefore, a high-quality image in which displacement of dots and fluctuation of scanning widths rarely occur can be formed on the photosensitive element 105.

In scanning of each line, with respect to a predetermined time zone in which a scanning laser beam traverses photodetectors 108 and 109 (i.e., a predetermined time zone in which the horizontal synchronous signals 1 and 2 may be generated), a phase data pattern is set such that a phase shift amount of the pixel clock PCLK' is prevented from being changed. For example, in the time zone, phase data which makes a phase shift amount zero is output from the data generating circuit 18. This is because detection timing errors in the photodetectors 108 and 109 and count errors in the detection circuit 16 caused by the detection timing errors are prevented from being increased by a change in scanning speed caused by phase shift of pixel clocks in the time zone.

Correction of an uneven scanning speed by phase shift control of pixel clocks, i.e., correction of displacement of pixels in a main scanning direction will be briefly described below with reference to FIG. 2. An "ideal state" in FIG. 2 indicates dot (pixel) positions recorded in an ideal state which is completely free from an uneven scanning speed. In this case, 1200 dpi is set, and a dot diameter is set at about 21.2 micrometers. "Before correction", although initial dot positions are the same as those in the ideal state, displacement of the dot positions is caused by an uneven scanning speed. The sixth dot is displaced by 10.6 micrometers corresponding to half a dot at 1200 dpi with reference to the sixth dot in the ideal state. In this state, time required for 1 dot writing is time corresponding to one pixel clock. For this reason, when a resolving power of phase shift of pixel clocks is ⅛ a clock, a dot position can be corrected at an accuracy of ⅛ a dot. "After correction" shows dot positions obtained in a state in which, when a resolving power of phase shift is ⅛ a dot, i.e., ⅛ a pixel clock, phase shift of −⅛ a pixel clock is performed four times in a data region in the state "before correction" in which displacement of ½ a dot in the initial state. Theoretically, the dot position of the sixth dot can be shifted by −⅛ a pixel clock'4=−½ a pixel clock. Therefore, the dot positions can be corrected at an accuracy of ⅛ a dot with respect to the "ideal state".

In this manner, in principle, a correction amount of linearity can be controlled from 0% to 12.5% by shift performed every ±⅛ a dot. In addition, in 1200-dpi writing, main scanning displacement in an effective write width can be reduced to 2.6 micrometers (21.2 micrometers/8). A frequency of a high-frequency clock required for realization of displacement correction may be 8 times the basic frequency of a pixel clock. When the high-frequency clock having such a frequency is used, realization of the pixel clock generator 112 is not very difficult.

The pixel clock generating circuit 10, for example, as shown in FIG. 3, is constituted by a counter 12, a comparing circuit 13, a pixel clock control circuit 14, and a clock generating circuit 15. In this case, description will be made on the assumption that phase shift of the reference pixel clock PCLK is performed in units of ⅛-cycles of the high-frequency clock VCLK.

The counter 12 operates at the trailing edge of the high-frequency clock VCLK to count high-frequency clocks VCLK. The comparing circuit 13 compares a count value of the counter 12 with a preset value and phase data and outputs control signals a and b on the basis of the comparison result. The pixel clock control circuit 14 controls a transition timing of the reference pixel clock PCLK on the basis of the control signals a and b. The clock generating circuit 15 outputs a pixel clock PCLK' having a cycle which is twice the cycle of the reference pixel clock PCLK.

In this case, phase data is data to designate a phase shift amount of a pixel clock to correct dot displacement caused by the characteristics of a scanning lens or uneven rotation of the polygon mirror or to correct-dot displacement caused by aberration chromatica of a laser beam. The phase data is given by the data generating circuit 18 as described above. The phase data is generally given as digital data of several bits.

An operation of the pixel clock generating circuit 10 will be described below with reference to timing charts shown in FIGS. 4A to 4C. In this case, the reference pixel clock PCLK is an 8-divided frequency clock of the high-frequency clock VCLK when a phase shift amount is 0. The duty ratio of the reference pixel clock PCLK is set at 50%. This state is a state shown in FIG. 4A. FIG. 4B depicts a manner in which a reference pixel clock PCLK obtained by delaying the phase of the high-frequency clock VCLK by one cycle is generated. FIG. 4C depicts a manner in which a reference pixel clock PCLK obtained by advancing the phase of the high-frequency clock VCLK by one cycle.

Figure 4B:
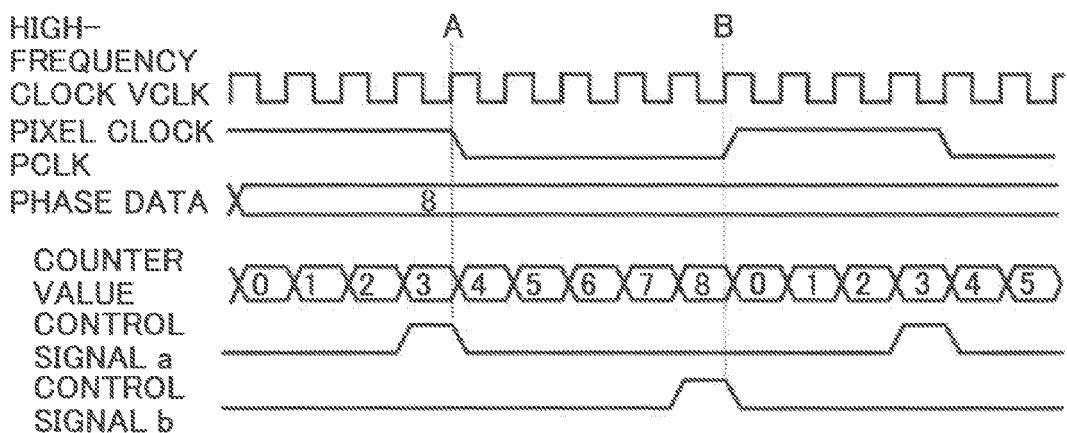
Figure 4C:
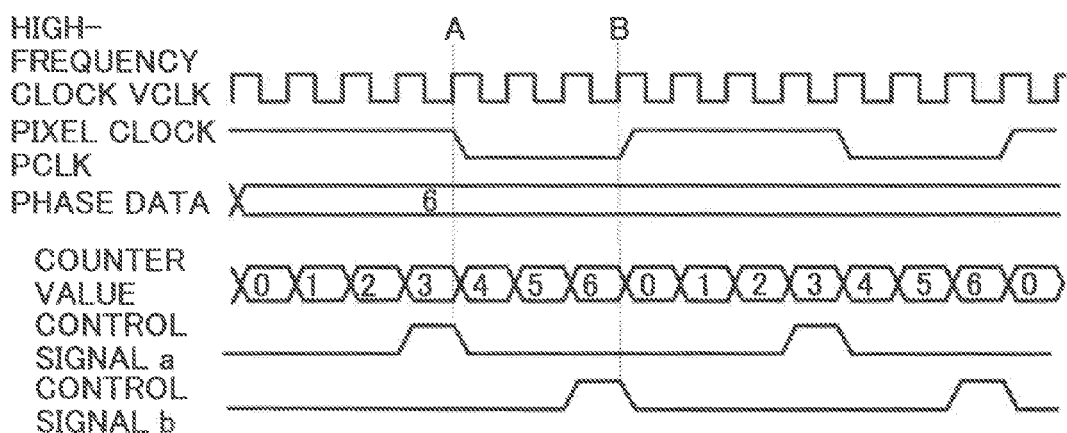

In FIG. 4A, a value of "7" is given as phase data. A value of "3" is set in the comparing circuit 13 in advance. The counter 12 operates at a leading edge of the high-frequency clock VCLK to count the high-frequency clocks VCLK. The comparing circuit 13 outputs the control signal a when the value of the counter 12 becomes "3". The pixel clock control circuit 14 performs transition of the reference pixel clock PCLK from "H" to "L" at timing (a) because the control signal a is set at "H". The comparing circuit 13 outputs the control signal b when given phase data is equal to the counter value of the counter 12. In this example, when the value of the counter 12 is "7", the comparing circuit 13 outputs the control signal b. The pixel clock control circuit 14 performs transition of the reference pixel clock PCLK from "L" to "H" at timing (b) because the control signal b is set "H". At the same time, the comparing circuit 13 resets the counter 12 to cause the counter 12 to perform counting from 0 again. In this manner, the reference pixel clock PCLK corresponding to an 8-divided frequency of the high-frequency clock VCLK and having a duty ratio of 50% is generated.

In FIG. 4B, a value of "8" is given as phase data. The comparing circuit 13 outputs a control signal a when the value of the counter 12 becomes "3". The pixel clock control circuit 14 performs transition of the reference pixel clock PCLK from "H" to "L" at timing (a) because the control signal a is set at "H". The comparing circuit 13 outputs a control signal b when the value of the counter 12 is equal to the given phase data (in this case, "8"). The pixel clock control circuit 14 performs transition of the reference pixel clock PCLK from "L" to "H" at timing (b) because the control signal b is set at "H". At the same time, the comparing circuit 13 resets the counter 12 to cause the counter 12 to perform counting from 0 again. In this manner, the reference pixel clock PCLK the phase of which is delayed by ⅛ a clock (corresponding to one clock of the high-frequency clock VCLK) with respect to the 8-divided frequency clock of the high-frequency clock VCLK is generated. This phase shift is equivalent to that the phase of the pixel clock PCLK' based on the reference pixel clock PCLK and having a cycle which is twice the cycle of the reference pixel clock PCLK is delayed by 1/16 a clock of the pixel clock PCLK'.

In this case, a value of "6" is given as phase data. The comparing circuit 13 outputs a control signal a when the value of the counter 12 becomes "3". The pixel clock control circuit 14 performs transition of the reference pixel clock PCLK from "H" to "L" at timing (a) because the control signal a is set at "H". The comparing circuit 13 outputs a control signal b when the value of the counter 12 is equal to the given phase data (in this case, "6"). The pixel clock control circuit 14 performs transition of the reference pixel clock PCLK from "L" to "H" at timing (b) because the control signal b is set at "H". At the same time, the comparing circuit 13 resets the counter 12 to cause the counter 12 to perform counting from 0 again. In this manner, the reference pixel clock PCLK the phase of which is advanced by ⅛ a clock with respect to the 8-divided frequency clock of the high-frequency clock VCLK is generated. This phase shift amount is equivalent to that the phase of the pixel clock PCLK' is advanced by 1/16 a clock of the pixel clock PCLK'.

Similarly, when a value of "5" is given as phase data, the reference pixel clock PCLK can be advanced by ⅔ a clock in phase, and the pixel clock PCLK' can be advanced by 2/16 a clock in phase. When a value of "9" is given as phase data, the reference pixel clock PCLK can be delayed by ⅔ a clock, and the pixel clock PCLK' can be delayed by 2/16 a clock.

An absolute value set with reference to "7" can also be given as phase data. In this case, phase data of "0" corresponds "7", and phase data of "+1" corresponds to "8", and phase data of "−1" corresponds to "6".

Figure 5:
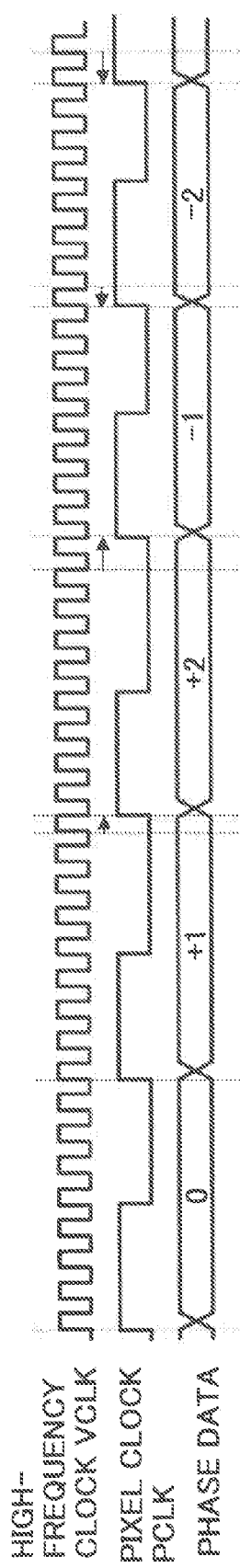
FIG. 5 is a timing chart of a phase shift of a reference pixel clock in a half-cycle unit of a high-frequency clock.

In the above, although a unit of a basic phase shift amount of phase shift of the reference pixel clock PCLK and the pixel clock PCLK' is one cycle of the high-frequency clock VCLK, phase shift control can also be performed such that ½ a cycle of the high-frequency clock VCLK is used as a basic phase shift amount. This example is shown in FIG. 5. In FIG. 5, phase data is expressed by an absolute value. Phase data of "0" corresponds to "7", phase data of "+1" corresponds to "7.5", phase data of "+2" corresponds to "8", phase data of "−1" corresponds to "6.5", and phase data of "−2" corresponds to "6". With reference to the reference pixel clock PCLK obtained when the phase data is "0", when the phase data is "+1", the reference pixel clock PCLK is delayed by $\frac{1}{16}$ a clock in phase. Therefore, the pixel clock PCLK' is delayed by $\frac{1}{32}$ a clock of the pixel clock PCLK' in phase. In this manner, phase shift control for the respective clocks can be more finely performed.

Figure 6:
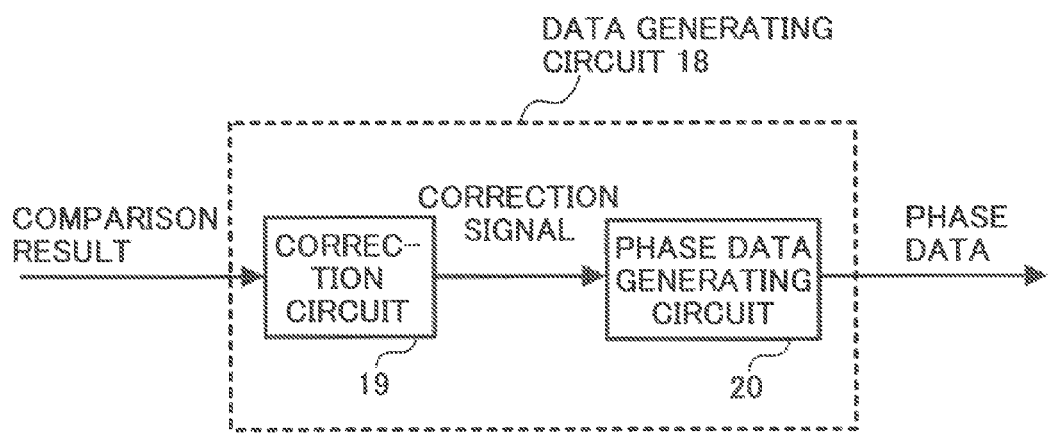
FIG. 6 is a block diagram of a data generating circuit.
Figure 7:
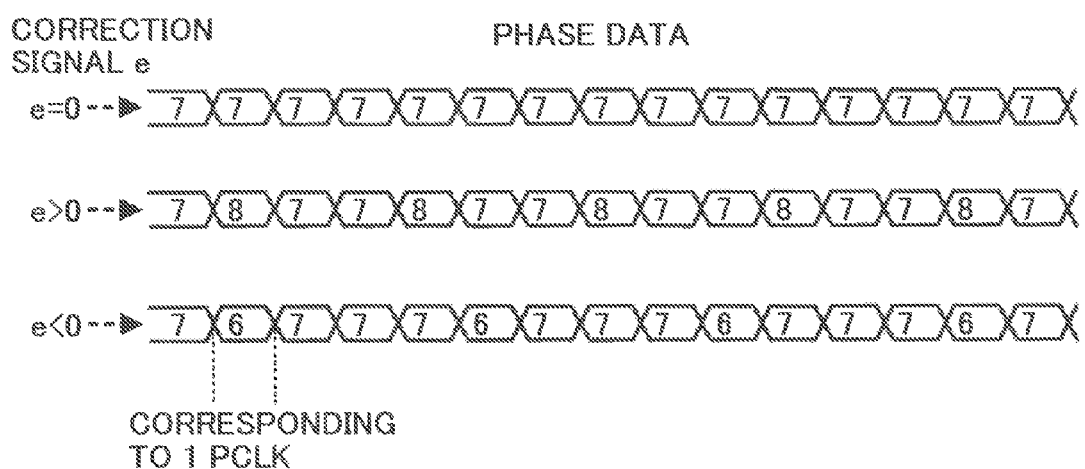
FIG. 7 is a schematic of a phase data pattern.

FIG. 6 is a block diagram of a data generating circuit 19. As shown in FIG. 6, the data generating circuit 18 is constituted by a correction circuit 19 and a data generating circuit 20. The correction circuit 19 integrates a scanning time error output from the comparison result generating circuit 17 every line to output a correction signal e. The data generating circuit 20 is constituted by a look-up table (LUT) or the like in which various phase data patterns which are set in advance as described above. The data generating circuit 20 sequentially outputs phase data depending on phase data patterns corresponding to the correction signal e in synchronism with a pixel clock. An example of the phase data pattern is shown in FIG. 7.

FIG. 8A depicts a phase data pattern obtained when the value of the correction signal e is "0". Phase data of "7" is output to all pixel clocks. FIG. 8B depicts a phase data pattern obtained when the value of the correction signal e is positive. In this pattern e phase data of "8" are inserted between the phase data of "7" at almost equal intervals. FIG. 8C is a phase data pattern obtained when the correction signal e is negative. In this pattern, |e| phase data of "6" are inserted between the phase data of "7" at almost equal intervals. When the pixel clocks the phases of which are shifted are dispersed to make it possible to reduce adverse affect to an image by phase shift.

Figure 8:
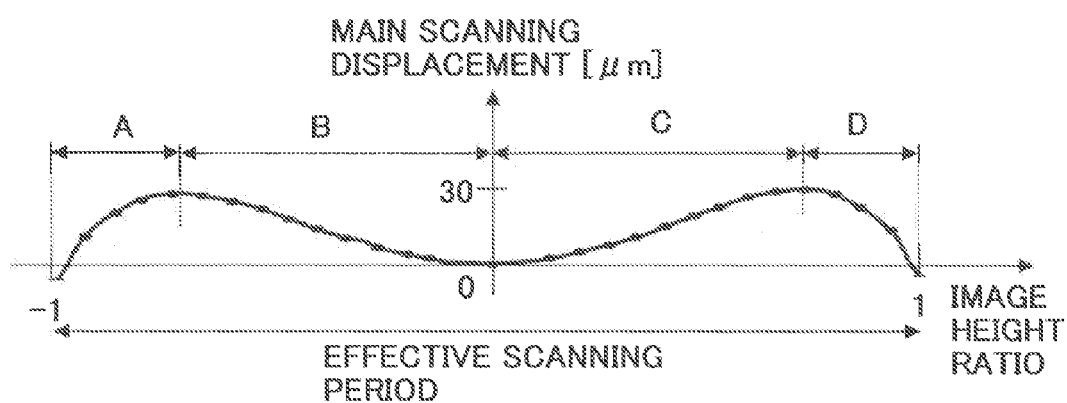
FIGS. 8A and 8B are explanatory diagrams of a relation between linearity of an optical system and phase data patterns.

The phase data pattern will be described in more detail with reference to FIG. 8. F*ig*. 8A depicts linearity characteristics of a lens system. The abscissa indicates an image height ratio, and the ordinate indicates displacement of dots in a main scanning direction. F*ig*. 8B depicts an example of a phase data pattern obtained by a lens system having such linearity characteristics.

As in a region A or C in which the inclination of a linearity curve is positive, dot intervals are larger than those in an ideal state. For this reason, phase data of "5" or "6" is given to advance the phase of the pixel clock, so that phase data of "5" is given to a portion where the inclination of the linearity curve is large. As in a region B or C in which the inclination of a linearity curve is negative, dot intervals are smaller than those in the ideal stage. For this reason, phase data of "9" or "8" is given to delay the phase of the pixel clock, and the phase data of "9" is given to a portion where the inclination of the linearity curve is large. Since dot intervals in a portion where the inclination of the linearity curve is 0 do not change, "7" is given as phase data.

In this manner, phase data of a pattern depending on linearity characteristics is generated to make an entire phase shift amount of pixel clocks equal to the value of the correction signal e. More specifically, when the correction signal e is "0", phase data is generated such that a sum of values of phase data is equal to "7×Np" where Np is the number of pixels of one line. When the correction signal e is positive, phase data is generated such that a sum of values of phase data of one line is equal to "7×Np+e". When the correction signal e is negative, phase data is generated such that a sum of values of phase data of one line is equal to "7×Np−|e|". In this manner, scanning widths between the lines can be uniformed, and displacement of dots in main scanning caused by the characteristics of a lens is corrected to make it possible to equalize pixel intervals.

As in the phase data pattern described up to now, phase data are selected such that a difference between the values of adjacent phase data does not exceed 1. This means that phase data are selected such that a difference between phase shift amounts between adjacent pixel clocks does not exceed a basic phase shift amount. In this manner, a fluctuation margin of continuous pixel clocks is minimum, and a cycle can be suppressed from being deviated. It is undesirable that the deviation of a pixel clock cycle is large because an image to be recorded is adversely affected.

Figure 9:
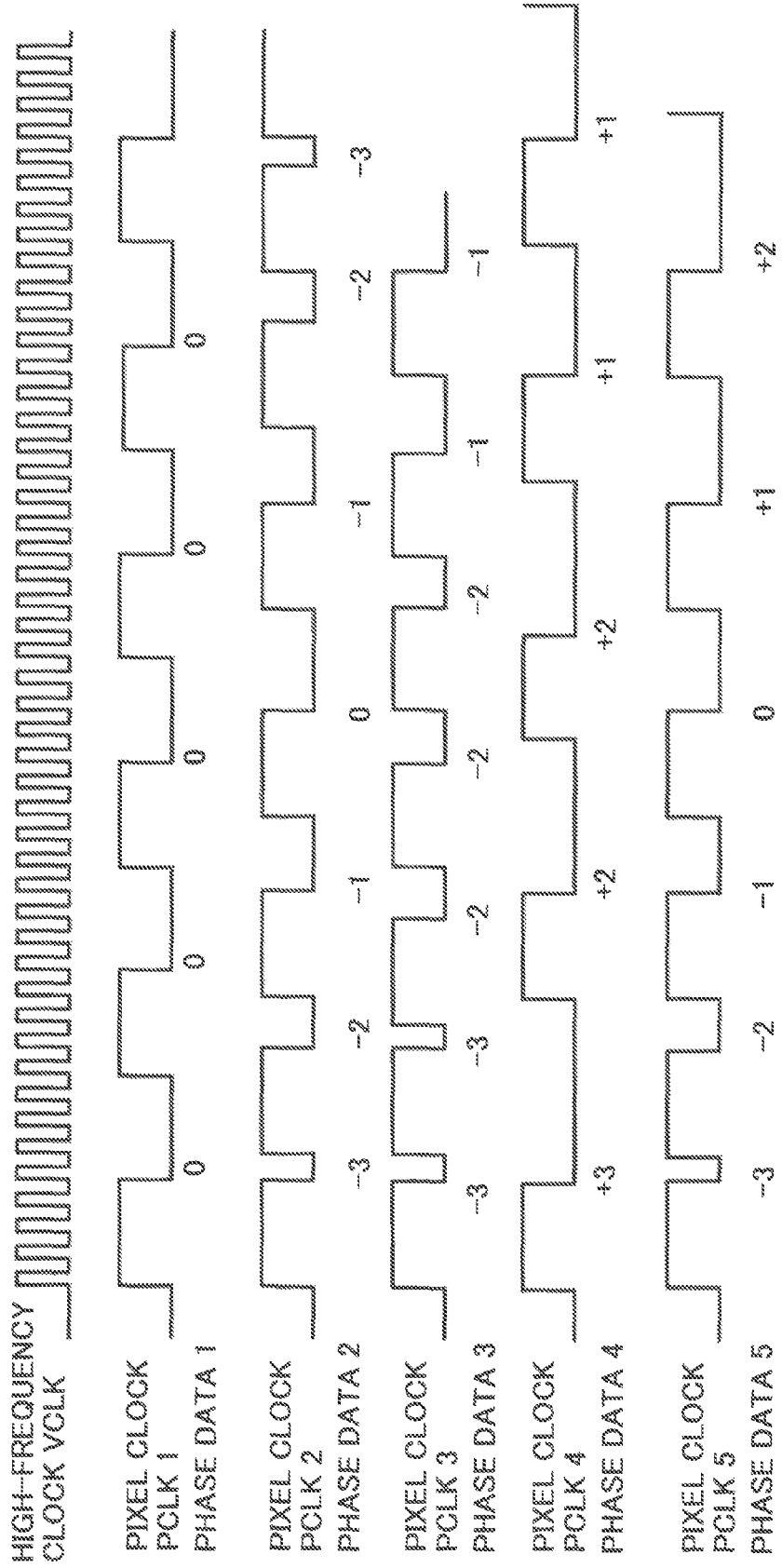
FIG. 9 is a timing chart of various phase shift patterns of a reference pixel clock.
Figure 10:
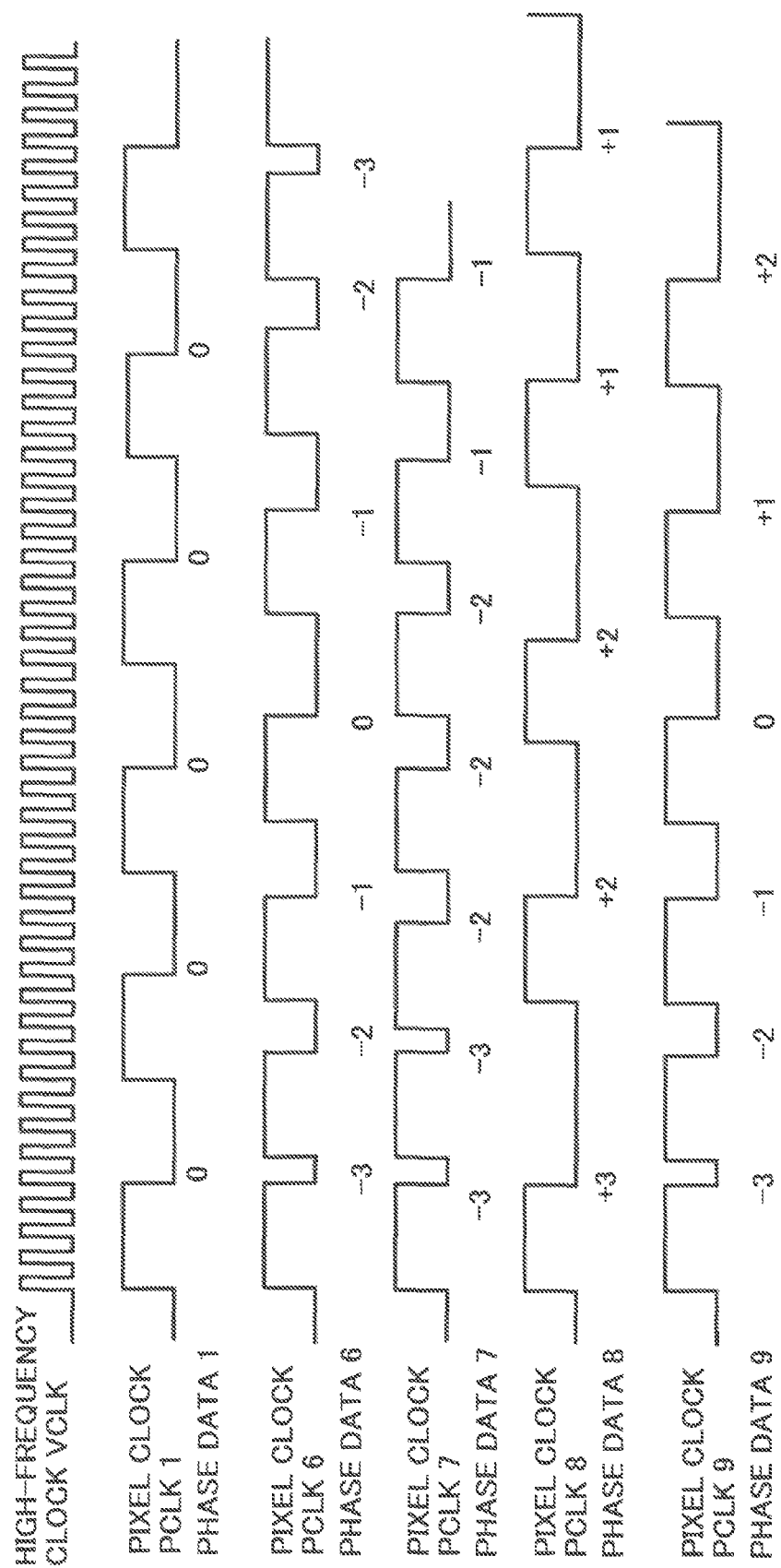
FIG. 10 is another timing chart of various phase shift patterns of a reference pixel clock.
Figure 11:
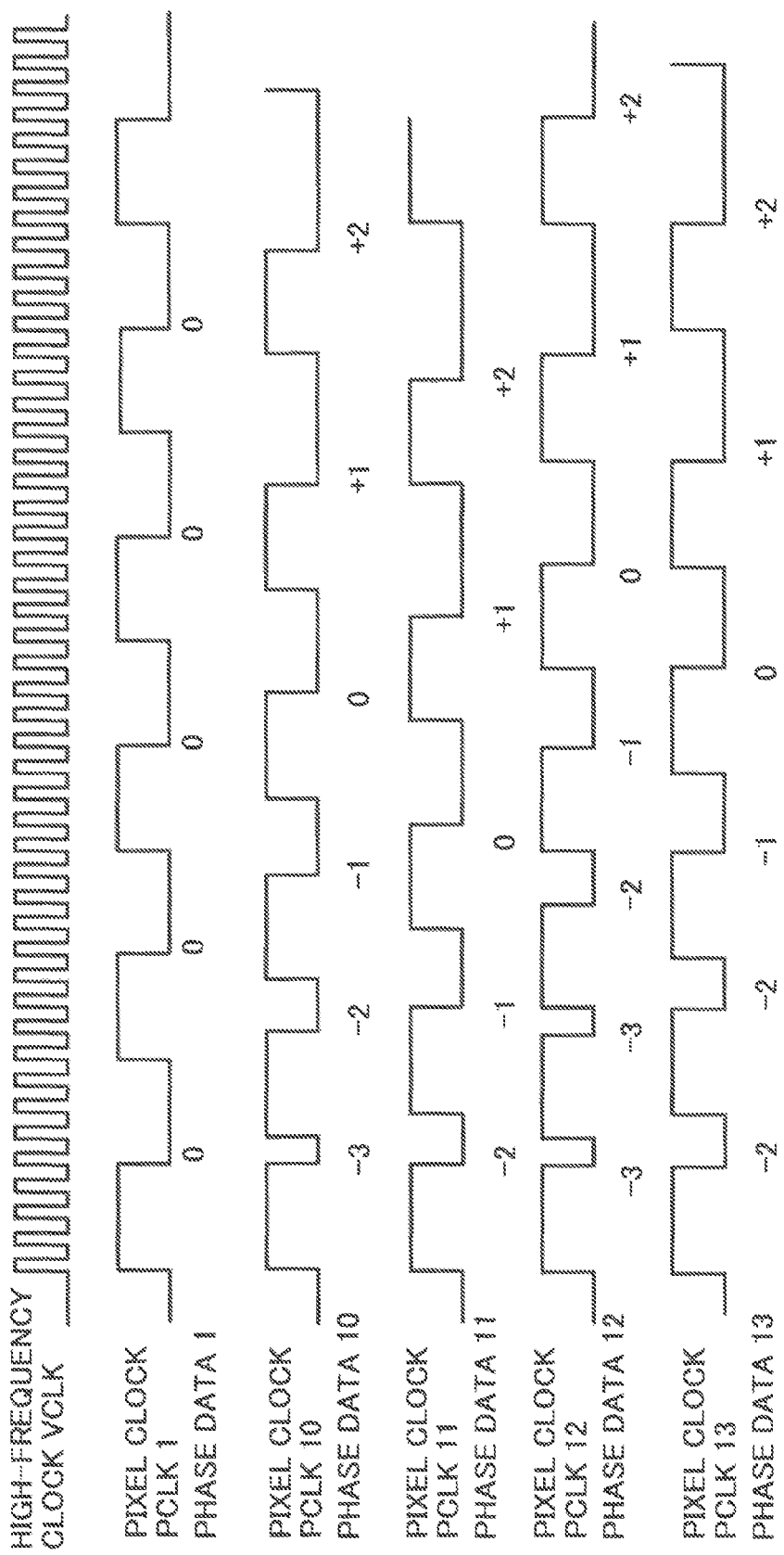
FIG. 11 is still another timing chart of various phase shift patterns of a reference pixel clock.

FIGS. 9, 10, and 11 depict various phase shifts of reference pixel clocks. In any case, phase shift if performed at an accuracy of on clock of the high-frequency clock VCLK. Phase data is a relative value for 7. With reference to a reference pixel clock PCLK (PCLK1 in each drawing) obtained when the phase data is 0, it is assumed that the phase is advanced by ⅛ a clock (expressed as ⅛PCLK) when the phase data is −1, that the phase is advanced by ⅔PCLK when the phase data is −2, that the phase is advanced by ⅜PCLK when the phase data is −3, that the phase is delayed by ⅛PCLK when the phase data is +1, that the phase is delayed by ⅔PCLK when the phase data is +2, and that the phase is delayed by ⅜PCLK when the phase data is +3. Therefore, the basic phase shift amount of the phase shift is ⅛PCLK.

In FIG. 9, in PCLK1, the phase data changes into −3, 0, −2, −2, −1, and 0. In a part in which the phase data changes from −3 to 0, the phase is largely shifted by ⅜PCLK. This is supposed as a large change in pixel clock cycle. Also in PCLK32, in parts in which the phase data is changed from +3 to 0 and +2 to 0, a change in pixel clock cycle is supposed as a large change. Therefore, the examples PCLK2 and PCLK3 are not preferable. In PCLK 3 or PCLK4, a phase shift amount difference between reference pixel clocks does not exceed a basic phase shift amount. For this reason, pixel clocks the cycles of which are slightly deviated can be generated.

In FIG. 10, PCLK6 is an example in which phase data is increased or decreased to −3, −2, −1, 0, −1, and −2 in a direction in which a phase is advanced every clock, and PCLK7 is an example in which phase data is changed to −3, −3, −2, −2, −2, −1 and −1 such that two or three equal values continue. In each of the examples PCL6 and PCLK7, a phase shift amount difference between clocks does not exceeds the basic phase shift amount. However, a change in phase is more moderate in PCLK7 than in PCLK6. In PCLK8, phase data is changed to +3, +2, +2, +2, +1, and +1 every clocks, and a sharp change in phase is avoided. In PCLK9, phase data is changed to −3, −2,−1, 0, +1, and +2 to shift a phase to an advance side and then shift the phase to a delay side. In PCLK9, a phase shift amount difference between clocks does not exceed a basic phase shift amount. PCLK9 is also similar to the above examples.

In FIG. 11, PCLK10 to PCLK13 are examples in which phase shift is performed every clock in units of basic phase shift amounts. PCLK12 is an example in which phase data is changed to −3, −3, −2,−1, 0, +1, and +2 such that a phase is changed every clock in units of basic phase shift amounts. A phase difference of ±1 basic phase shift amount is generated between the same clocks counted from the first clock. For example, when PCLK10 is periodically given, clocks are continuously deviated. However, when PCLK11, PCLK 12, and PCLK 13 are alternately or randomly given, accurate clock phase control which is free from periodical deviation of the clocks can be performed.

Figure 12:
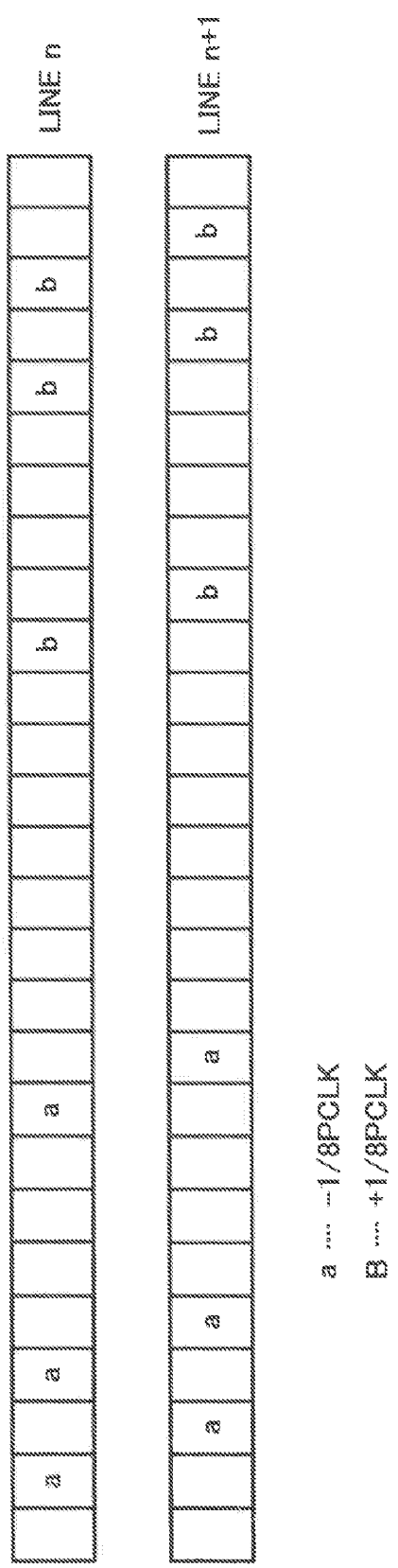
FIG. 12 is a schematic of a phase shift pattern between adjacent lines.

The clock phase control will be described below with reference to FIG. 12. When a pixel clock is shifted in the same pattern in a continuous scanning line, and when a shift pattern of pixel clocks as shown in the upper part in FIG. 12 is applied to a scanning line, image quality may be adversely affected by concentration of phase-shifted pixels. Therefore, as shown in, e.g., FIG. 12, phase shift of pixel clocks is controlled such that phase-shifted pixels are displaced every scanning line, so that the phase-shifted pixels are avoided from being concentrated. Therefore, image quality can be avoided from being adversely affected by the phase shift. In the data generating circuit 18, this control can be performed by switching phase data patterns applied to the lines such that the same phase data pattern is not applied to continuous lines.

Figure 13:
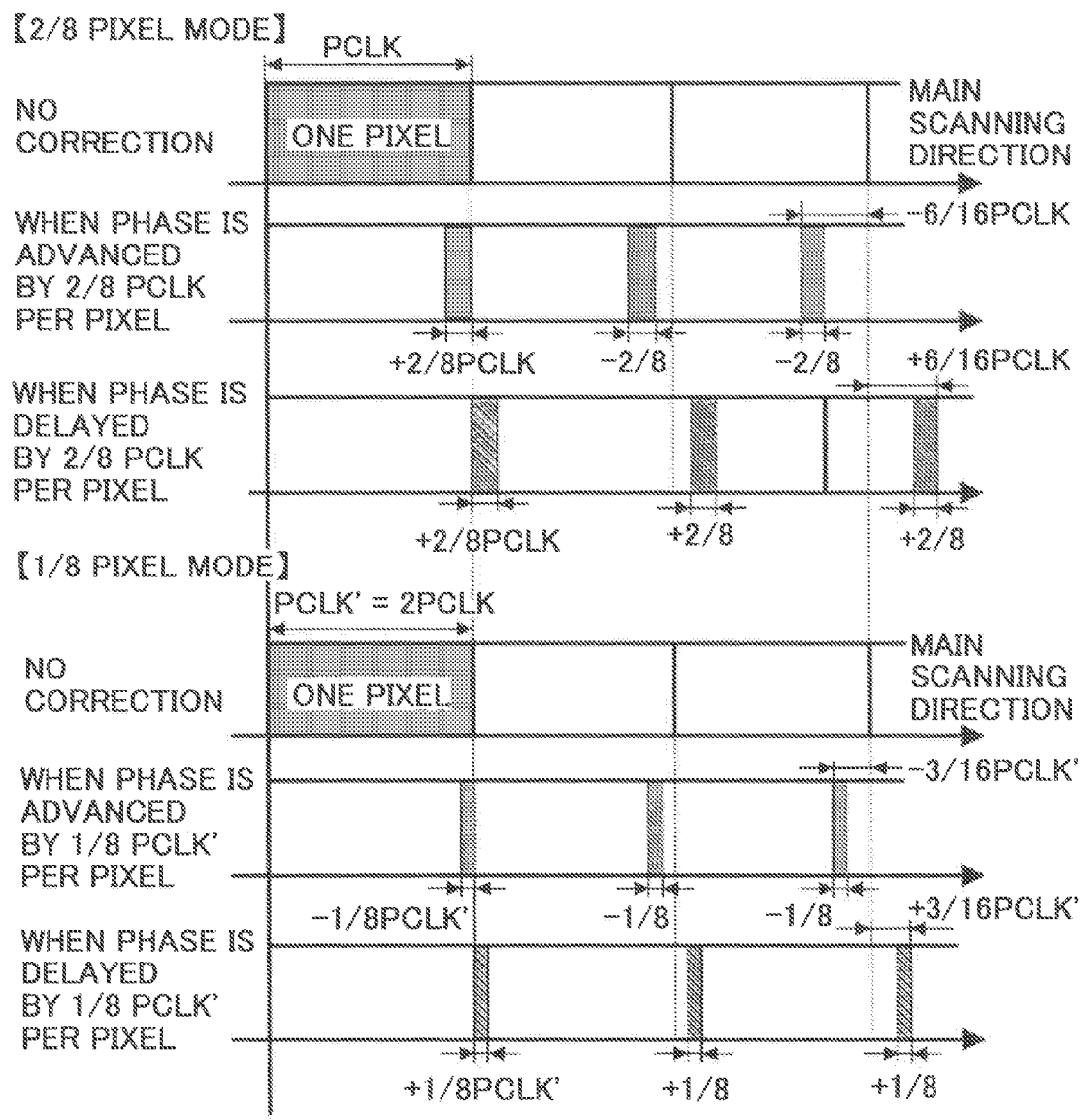
FIG. 13 is a schematic of a relation between the phase shift of the pixel clock and a variation of a pixel position.

FIG. 13 shows a change in pixel position when a pixel clock is phase-shifted by ±⅛ a clock or ±⅔ a clock per pixel. When a phase is advanced every +⅛PCLK in continuous pixel clocks, a pixel width which is 12.5% shorter than a pixel width obtained when phase shift is not performed. In contrast to this, when a phase is advanced every −⅛PCLK, a pixel width is 12.5% longer than the pixel width obtained when phase shift is not performed. When a phase is advance every ±⅔PCLK, the pixel width can be changed by ±25%. When phase shift control is-performed every −⅜PCLK, −⅔PCLK, −⅛PCLK, 0, +⅛PCLK, +⅔PCLK, and +⅜PCLK, phase control of pixel clocks can be performed at an accuracy of ⅛PCLK within a range of ±⅜PCLK.

Figure 14:
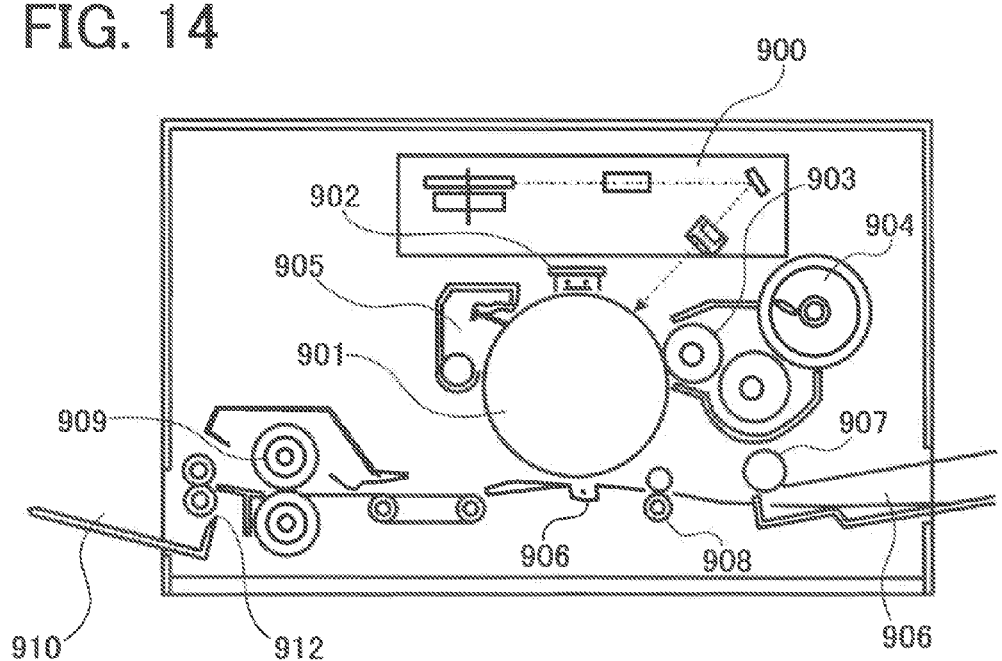
FIG. 14 is a schematic of an image forming apparatus according to an embodiment of the present invention.
Figure 15:
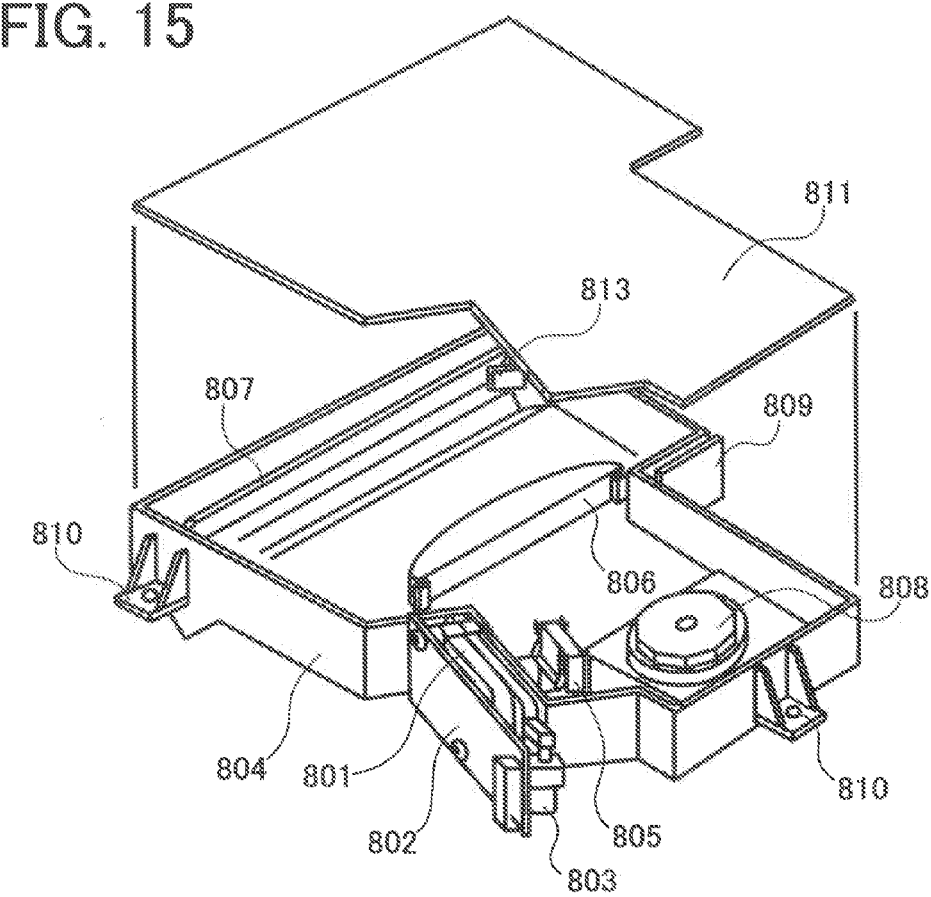
FIG. 15 is a perspective view of an optical scanner according to an embodiment of the present invention.

FIG. 14 is a schematic diagram of an image forming apparatus according to an embodiment of the present invention. In FIG. 14, reference numeral 900 denotes an optical scanner according to the present invention and has a configuration as shown in FIG. 15. Around a photosensitive element drum 901, a charger 902 to charge the surface of the photosensitive element drum 901 to a high voltage, a developing unit including a developing roller 903, a toner cartridge 904 which supplies toner to the developing roller 903, and the like, a transfer charger 906 to transfer a toner image on the photosensitive element drum 901 to a sheet of recording paper, and a cleaning case 905 which removes residual toner on the photosensitive element drum 901 by scratching and deposits the toner are arranged. A sheet of recording paper is supplied from a paper feed tray 906 by a paper feed roller 907 and sent by a photodetector 908 at a timing of recording start in a sub-scanning direction, and passes between the photosensitive element drum 901 and the transfer charger 906. At this time, a toner image is transferred to the sheet of recording paper. After the toner image on the sheet of recording paper is fixed by a photodetector 909, the sheet of recording paper is delivered to a catch tray 910 by a delivery roller 912. A recording operation is the same as a known recording operation. The surface of the photosensitive element drum 901 charged by the charger 902 is scanned by an optical beam from the optical scanner 900. An electrostatic latent image formed by the scanning is developed into a toner image when the sheet of recording paper passes through the developing unit. The toner image is transferred to the sheet of recording paper when the sheet of recording paper passes through the transfer charger 906.

The optical scanner 900 according to the embodiment has a configuration shown as a schematic perspective view in FIG. 15. In FIG. 15, reference numeral 801 denotes an optical unit. The optical unit 801 includes a laser source. A printed circuit board 802 on which circuits for pixel clock generation and laser drive as shown in FIG. 1 are mounted is attached to the rear side of the optical unit 801. The optical unit 801 is pressed by a spring against a wall surface of an optical housing perpendicular to an optical axis. The inclination of the optical unit 801 is adjusted and held by an adjusting screw 803. The adjusting screw 803 is meshed with a projection formed on the wall surface of the housing. Inside the optical housing, a cylinder lens 805, a polygon mirror 808, a drive motor for the polygon mirror 808, an fθ lens 806, a folding mirror 807, and a toroidal lens 812 are positioned and fixed. Reference numeral 813 denotes a mirror for horizontal synchronous detection. A printed circuit board 809 on which a synchronous detection sensor to detect an optical beam reflected by the mirror 813 is mounted is arranged on the wall surface of the housing. The optical housing is sealed by a cover 811 on the upper side and fixed by screws to the frame member of the image forming apparatus body at a plurality of fixing portions 810 projecting from the wall surface.

The present invention can also be similarly applied to a multi-beam optical scanner or a multi-beam image forming apparatus. An example of such an image forming apparatus will be described below with reference to FIGS. 16 and 17.

Figure 16:
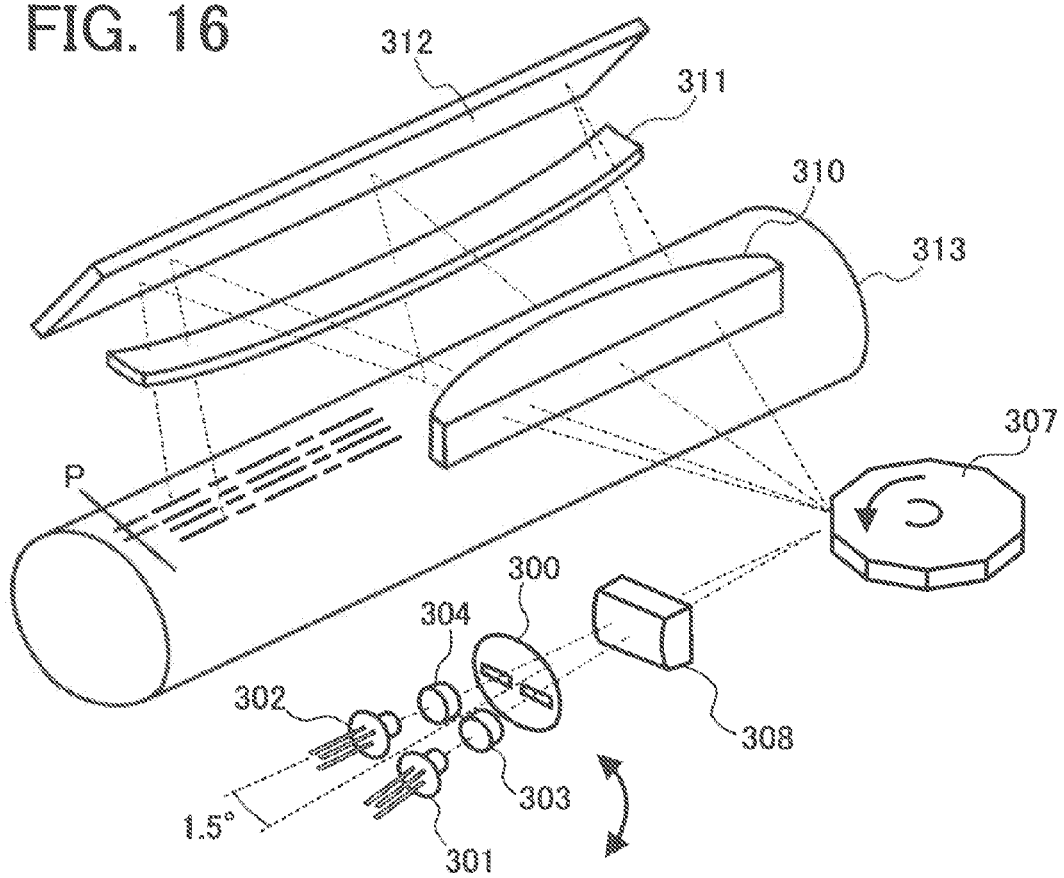
FIG. 16 is a schematic of a multi-beam image forming apparatus according to an embodiment of the present invention.
Figure 17:
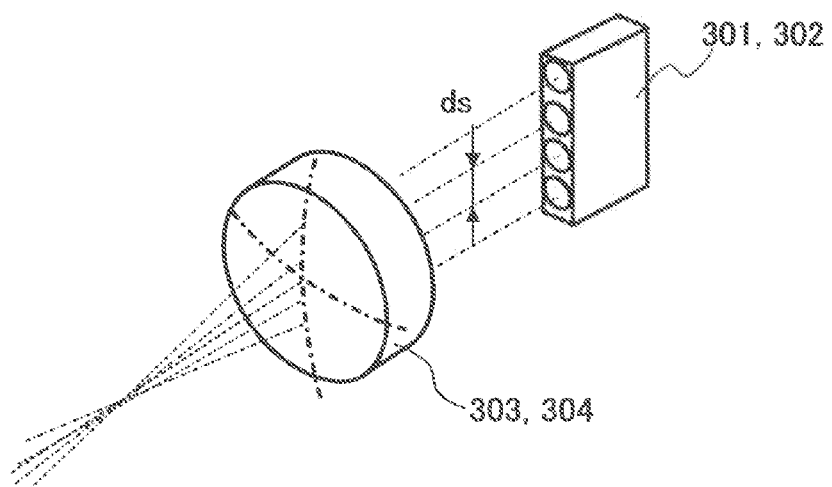
FIG. 17 is a schematic of a semiconductor laser array.

In FIG. 16, reference numerals 301 and 302 denote semiconductor laser arrays. As the semiconductor laser array, as typically shown in FIG. 17, a semiconductor laser array in which four light sources are monolithically arranged at intervals of ds=25 micrometers is used. The optical axes of the semiconductor laser arrays 300 and 302 are made equal to the optical axes of collimator lenses 303 and 304, have emission angles which are symmetrical with respect to a main scanning direction, and are laid out such that emission axes of the semiconductor laser arrays 300 and 302 cross each other at a reflecting point of a polygon mirror 307. A plurality of beams emitted from the semiconductor laser arrays 301 and 302 are incident on the polygon mirror 307 through the collimator lenses 303 and 304, an aperture 310, and a cylinder lens 308 and scanned at once. The laser beam forms an image on a photosensitive element 312 through an fθ lens 310, a folding mirror 313, and a toroidal lens 311. Although horizontal synchronous detection is also performed, photodetectors for the horizontal synchronous detection are not shown. Although the pixel clock generating device, the image processing device, the laser drive generating device, and the laser drive device as shown in FIG. 1 are present, these devices are not shown.

In the multi-beam image forming apparatus, a difference between optical scanning lengths and a difference between magnifications caused by wavelength errors of beams must be considered. For this reason, phase control of pixel clocks as described above are performed to cope with the beams. Drive timings of the light sources are regulated depending on pixel clocks corresponding to the light sources.

Around the folding mirror 313, a charger to uniformly charge the folding mirror 313, a developing unit to develop an electrostatic latent image into a tone image, a transfer unit which transfers the toner image on the photosensitive element to a sheet of recording paper or an intermediate transfer medium, a cleaner which removes and collects residual toner on the photosensitive element, and the like are present. These components are not shown because the components are included in a general configuration.

A part constituted by elements directly related to scanning of the folding mirror 313 except for the units arranged around the folding mirror 313 is an optical scanner according to the embodiment.

Fourth Embodiment

The present invention can also be applied to a tandem type color image forming apparatus. An outline of the embodiment will be described below with reference to FIG. 18.

In a color image forming apparatus according to the embodiment, different photosensitive elements 2509*a*, 2509*b*, 2509*c*, and 2509*d* are used for image formation of colors, i.e., cyan, magenta, yellow, and black. In such a tandem type apparatus, since photosensitive elements in stations for the respective colors are scanned by optical beams passing through different optical paths, displacements of dots occurring on the photosensitive elements have different characteristics in the different stations. Therefore, unless the displacements of the dots are appropriately performed in the stations for the respective colors, preferable image quality, in particular, preferable color reproducibility cannot be obtained.

Figure 18:
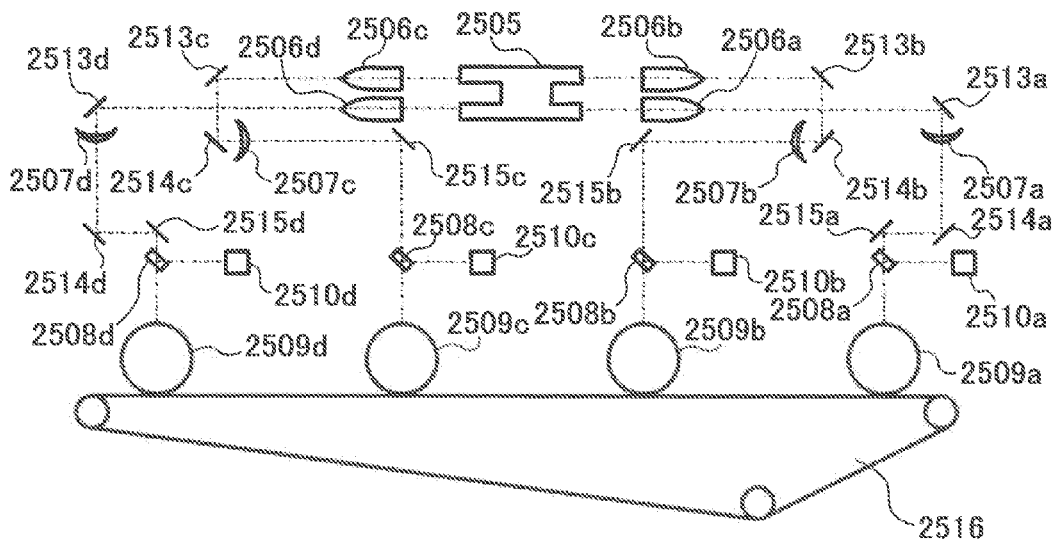
FIG. 18 is a schematic of a tandem type color image forming apparatus according to an embodiment of the, present invention.
Figure 19:
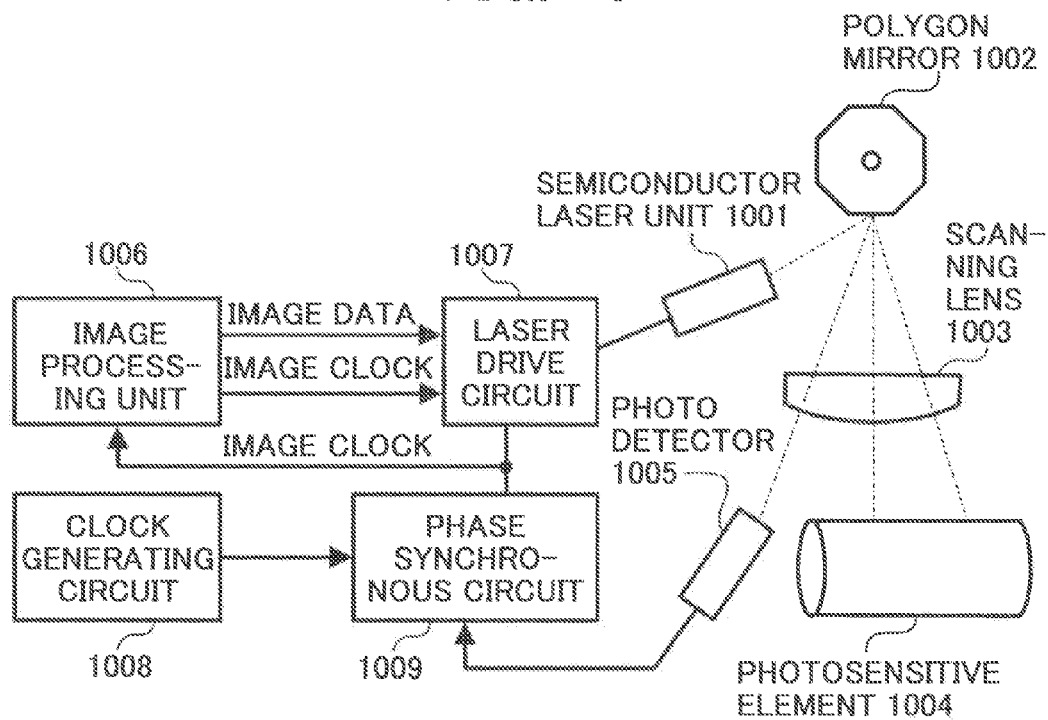
FIG. 19 is a schematic of a conventional image forming apparatus.
Figure 20:
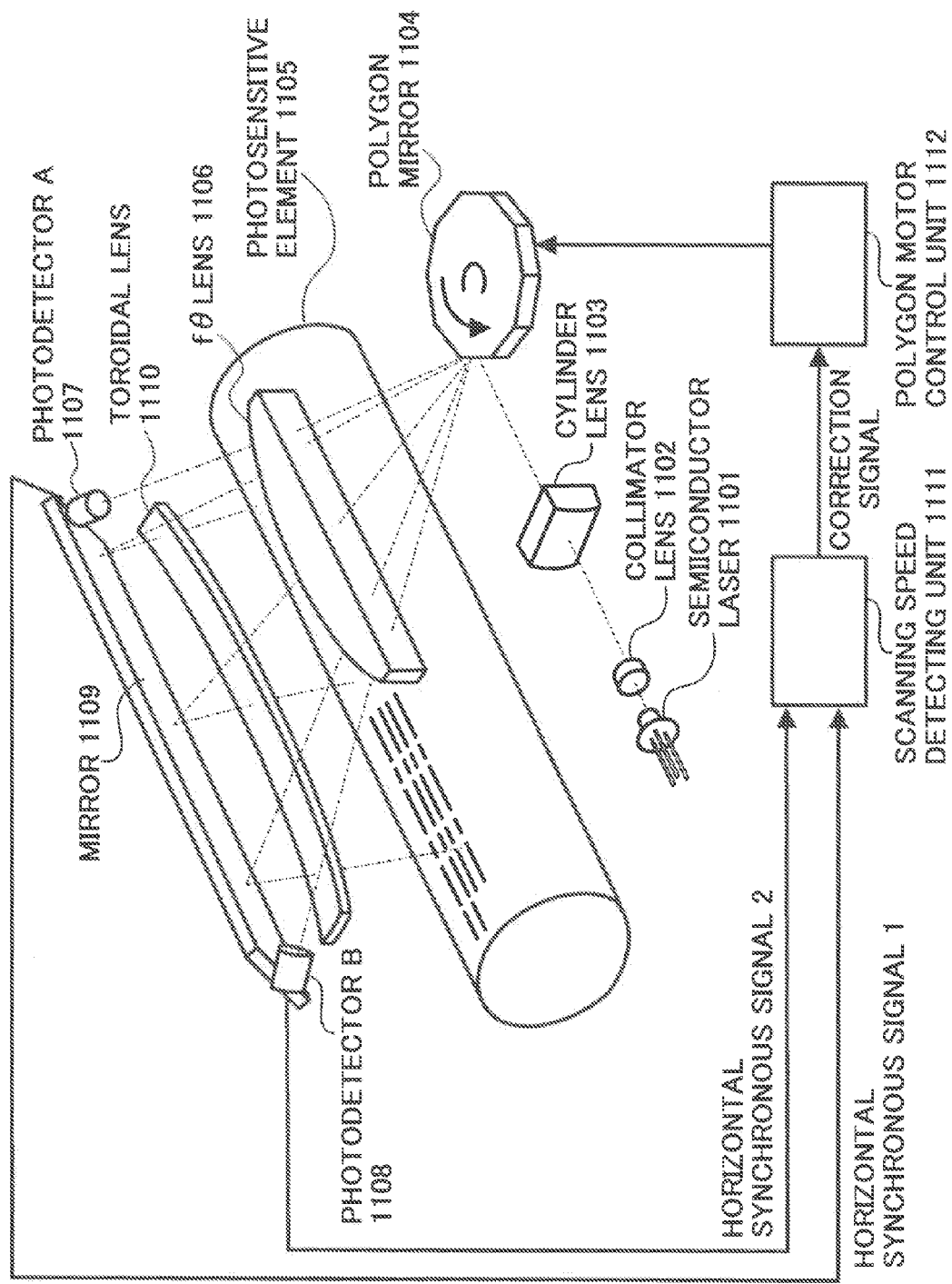
FIG. 20 is a schematic of a conventional image forming apparatus.

In FIG. 18, reference numeral 2505 denotes a polygon mirror is constituted by two upper and lower stages. Although not shown, one optical beam or a plurality of optical beams is output from laser beams prepared for the respective color stations. The optical beams are simultaneously incident on different reflective surfaces of the polygon mirror 2505 through an optical system such as a collimator lens or a cylinder lens (not shown).

A station including the photosensitive element 2509*a* will be described below. An optical beam deflected by a polygon mirror 2505 scans the photosensitive element 2509*a* through a first scanning lens 2506*a*, a mirror 2513*a*, a second scanning lens 2507*a*, mirrors 2514*a* and 2515*a*, and a beam splitter 2508*a* to form an electrostatic latent image. Some laser beam reflected by the half mirror surface of the beam splitter 2508*a* is detected by a photodetector 2510*a* for horizontal synchronous detection. As is apparent from FIG. 18, since each of the stations of the other colors has the same configuration as the station described above, a description of the stations are not repeated.

Although not shown, the light-source drive system as shown in FIG. 1 is arranged in each of the stations. The light source drive systems are synchronized in line by horizontal synchronous signals obtained by the photodetectors 2510*a*, 2510*b*, 2510*c*, and 2510*d* for horizontal synchronous detection. Since a phase control method for pixel clocks in the optical drive systems is the same as described above, a description of the phase control method is not repeated.

Around the photosensitive elements 2509*a*, 2509*b*, 2509*c*, and 2509*d* in the stations, a unit to uniformly charge the photosensitive element surfaces, a unit which develops electrostatic latent images on the photosensitive element into toner images of the colors, a unit which transfers the developed toner images to the intermediate transfer medium 2516, a unit which removes and collects residual toner which is not transferred to the photosensitive element surface, a unit which superposes the toner images of the respective colors on the intermediate transfer medium 2516 to transfer the resultant image to a sheet of paper, a unit which fixes the toner image on the sheet of paper, and the like are present. However, these units are not shown.

In the image forming apparatus according to the embodiment, since displacement of dots in a main scanning direction in the color stations is accurately corrected by phase control of pixel clocks, a high-quality image having small displacement of dots can be obtained. In particular, a color shift caused by displacement of dots in the different stations can be effectively reduced, an image with good color reproducibility can be obtained. For example, when a color shift of about several 10 µm occurs in the stations, phase shift is performed to pixel clocks the main scanning displacement of which exceeds ⅛ a dot to correct the main scanning displacement, so that a dot displacement can be reduced to about 2.6 micrometers (21.2 micrometers/8) corresponding to ⅛ a dot when a resolution is 1200dpi.

It is effective that different shift patterns of pixel clocks are used to different colors, respectively. For example, in consideration of an example shown in FIG. 11, when the shift patterns PCLK10, PCLK11, PCLK12, and PCLK13 are applied to pixel clocks of Y, M, C, and K, respectively, adverse affect caused by deviation of the cycles of the pixel clocks can be effectively prevented in comparison with a case in which PCLK10 is commonly applied to Y, M, C, and K. Therefore, the data generating circuit (FIG. 1) preferably generates phase data depending on different phase data patterns set for the respective colors.

According to the present invention, it is possible to perform correction having good accuracy against an uneven scanning speed or fluctuation of scanning widths while preventing image quality form being adversely affected.

Moreover, according to the present invention, it is possible to prevent the number of errors of horizontal synchronous detection by a phase shift of a pixel clock from increasing.

Furthermore, according to the present invention, it is not necessary to set a frequency of a high-frequency clock to a frequency that is considerably higher than a basic frequency of the pixel clock to obtain a large advantage to realize a pixel clock generator.

Moreover, according to the present invention, it is possible to perform optical scanning in which an uneven scanning speed and fluctuation of scanning widths are corrected at high accuracy, and prevent image quality from being adversely affected by the correction.

Furthermore, according to the present invention, it is possible to form a color image having preferable color reproducibility.

Moreover, according to the present invention, it is possible to effectively prevent adverse affect caused by concentration of phase shift of pixel clocks.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A pixel clock generator configured to generate a pixel clock to regulate a drive timing of a light source that generates an optical beam to scan a medium to be scanned, comprising:
   a phase data generating unit configured to generate phase data according to a phase data pattern to correct an uneven scanning speed and fluctuation of scanning widths;
   a high-frequency clock generating unit configured to generate a high-frequency clock; and
   a pixel clock generating unit configured to generate, based on the high-frequency clock, the pixel clock of which a cycle is longer than a cycle of the high-frequency clock and to perform a phase shift for the pixel clock based on the phase data, wherein
   the phase data pattern defines a plurality of phase data each designating an amount of phase shift for a different pixel clock pulse belonging to one line in a main scanning direction and is set such that each difference in the amount of the phase shift between adjacent phase data does not exceed a basic phase shift amount of the pixel clock generating unit, the basic phase shift amount being one or one-half of the cycle of the high-frequency clock.

2. The pixel clock generator according to claim 1, wherein the phase data pattern is set such that the amount of the phase shift is changed in a unit of a plurality of the pixel clocks.

3. The pixel clock generator according to claim 1, wherein the phase data pattern is set such that the amount of the phase shift is kept to a certain amount for a pixel clock that corresponds to a time frame for horizontal synchronous detection for scanning.

4. The pixel clock generator according to claim 1, wherein the phase data pattern is switched for every scanning line.

5. An optical scanner configured to drive a light source based on image data, and to scan a medium to be scanned with an optical beam output from the light source, comprising:
   a pixel clock generator configured to generate a pixel clock, and that includes
      a phase data generating unit configured to generate phase data according to a phase data pattern to correct an uneven scanning speed and fluctuation of scanning widths;
      a high-frequency clock generating unit configured to generate a high-frequency clock; and
      a pixel clock generating unit configured to generate, based on the high-frequency clock, the pixel clock of which a cycle is longer than a cycle of the high-frequency clock and to perform a phase shift for the pixel clock based on the phase data, wherein
      the phase data pattern defines a plurality of phase data each designating an amount of phase shift for a different pixel clock pulse belonging to one line in a main scanning direction and is set such that each difference in the amount of the phase shift between adjacent phase data does not exceed a basic phase shift amount of the pixel clock generating unit, the basic phase shift amount being one or one-half of the cycle of the high-frequency clock, and wherein
   a drive timing of the light source is regulated by the pixel clock generated.

6. An optical scanner configured to drive a plurality of light sources based on image data, and to scan a medium to be scanned simultaneously with a plurality of optical beams output from the light sources, comprising:
   a pixel clock generator configured to generate a pixel clock to regulate a drive timing of the light sources, and that includes
      a phase data generating unit configured to generate phase data according to a phase data pattern to correct an uneven scanning speed and fluctuation of scanning widths;
      a high-frequency clock generating unit configured to generate a high-frequency clock; and
      a pixel clock generating unit configured to generate, based on the high-frequency clock, the pixel clock of which a cycle is longer than a cycle of the high-frequency clock and to perform a phase shift for the pixel clock based on the phase data, wherein
      the phase data pattern defines a plurality of phase data each designating an amount of phase shift for a different pixel clock pulse belonging to one line in a main scanning direction and is set such that each difference in the amount of the phase shift between adjacent phase data does not exceed a basic phase shift amount of the pixel clock generating unit, the basic phase shift amount being one or one-half of the cycle of the high-frequency clock, and wherein
   the pixel clock generator is configured to generate the pixel clock that corresponds to each of the light sources, and the drive timing of each of the light sources is regulated by the pixel clock that corresponds to each of the light sources.

7. An image forming apparatus, comprising:
an optical scanner configured to drive a light source based on image data, and to scan a medium to be scanned with an optical beam output from the light source that includes
   a pixel clock generator configured to generate a pixel clock including
      a phase data generating unit configured to generate phase data according to a phase data pattern to correct an uneven scanning speed and fluctuation of scanning widths;
      a high-frequency clock generating unit configured to generate a high-frequency clock; and
      a pixel clock generating unit configured to generate, based on the high-frequency clock, the pixel clock of which a cycle is longer than a cycle of the high-frequency clock and to perform a phase shift for the pixel clock based on the phase data, wherein
      the phase data pattern defines a plurality of phase data each designating an amount of phase shift for a different pixel clock pulse belonging to one line in a main scanning direction and is set such that each difference in the amount of the phase shift between adjacent phase data does not exceed a basic phase shift amount of the pixel clock generating unit, the basic phase shift amount being one or one-half of the cycle of the high-frequency clock, and wherein
   a drive timing of the light source is regulated by the pixel clock generated; and
a medium to be scanned by the optical scanner, wherein an electrostatic latent image of an image is formed on the medium by scanning the image with the optical scanner.

8. An image forming apparatus, comprising:
an optical scanner configured to drive a plurality of light sources based on image data, and to scan a medium to be scanned simultaneously with a plurality of optical beams output from the light sources that includes
   a pixel clock generator configured to generate a pixel clock to regulate a drive timing of the light sources including
      a phase data generating unit configured to generate phase data according to a phase data pattern to correct an uneven scanning speed and fluctuation of scanning widths;
      a high-frequency clock generating unit configured to generate a high-frequency clock; and
      a pixel clock generating unit configured to generate, based on a high-frequency clock, the pixel clock of which a cycle is longer than a cycle of the high-frequency clock, and to perform a phase shift for the pixel clock based on the phase data, wherein
      the phase data pattern defines a plurality of phase data each designating an amount of phase shift for a different pixel clock pulse belonging to one line in a main scanning direction and is set such that each difference in the amount of the phase shift between adjacent phase data does not exceed a basic phase shift amount of the pixel clock generating unit, the basic phase shift amount being one or one-half of the cycle of the high-frequency clock, and wherein the pixel clock generator is configured to generate the pixel clock that corresponds to each of the light sources, and the drive timing of each of the light sources is regulated by the pixel clock that corresponds to each of the light sources; and a medium to be scanned by the optical scanner, wherein an electrostatic latent image of an image is formed on the medium by scanning the image with the optical scanner.

9. An image forming apparatus configured to scan a plurality of mediums to be scanned that are of different colors by an optical beam output from a plurality of light sources for each color that are driven based on image data to form electrostatic latent images for each color on the mediums, comprising:

a pixel clock generator configured to generate a pixel clock to regulate a drive timing of the light sources, and that includes a phase data generating unit configured to generate phase data according to a phase data pattern, independently set for each of the different colors, to correct an uneven scanning speed and fluctuation of scanning widths;

a high-frequency clock generating unit configured to generate a high-frequency clock; and a pixel clock generating unit configured to generate, based on the high-frequency clock, the pixel clock of which a cycle is longer than a cycle of the high-frequency clock and to perform a phase shift for the pixel clock based on the phase data, wherein the phase data pattern defines a plurality of phase data each designating an amount of phase shift for a different pixel clock pulse belonging to one line in a main scanning direction and is set such that each difference in the amount of the phase shift between adjacent phase data does not exceed a basic phase shift amount of the pixel clock generating unit, the basic phase shift amount being one or one-half of the cycle of the high-frequency clock, and wherein the pixel clock generator is configured to generate the pixel clock that corresponds to each of the light sources, and the drive timing of each of the light sources is regulated by the pixel clock that corresponds to each of the light sources.

10. The pixel clock generator according to claim 1, wherein the pixel clock generating unit is configured to perform the phase shift in integer multiples of the basic shift amount.

11. The optical scanner according to claim 5, wherein the pixel clock generating unit is configured to perform the phase shift in integer multiples of the basic shift amount.

12. The optical scanner according to claim 6, wherein the pixel clock generating unit is configured to perform the phase shift in integer multiples of the basic shift amount.

13. The image forming apparatus according to claim 7, wherein the pixel clock generating unit is configured to perform the phase shift in integer multiples of the basic shift amount.

14. The image forming apparatus according to claim 9, wherein the pixel clock generating unit is configured to perform the phase shift in integer multiples of the basic shift amount.

15. The pixel clock generator according to claim 1, wherein the phase data generating unit is configured to store a plurality of phase data patterns of different types to correct the uneven scanning speed and fluctuation of scanning widths, to select one of the plurality of phase data patterns, and to generate the phase data according to the selected one of the plurality of phase data patterns.

* * * * *